US012544904B2

(12) United States Patent
Schmidt

(10) Patent No.: US 12,544,904 B2
(45) Date of Patent: Feb. 10, 2026

(54) HAND TOOL WITH REPLACEABLE HANDLE

(71) Applicant: Milwaukee Electric Tool Corporation, Brookfield, WI (US)

(72) Inventor: Lucas M. Schmidt, Eagle, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 359 days.

(21) Appl. No.: 18/173,517

(22) Filed: Feb. 23, 2023

(65) Prior Publication Data

US 2023/0256585 A1 Aug. 17, 2023

Related U.S. Application Data

(63) Continuation of application No. PCT/US2023/062407, filed on Feb. 10, 2023.

(60) Provisional application No. 63/309,144, filed on Feb. 11, 2022.

(51) Int. Cl.

| | |
|---|---|
| ***B25G 1/00*** | (2006.01) |
| ***B25D 1/00*** | (2006.01) |
| ***B25G 1/01*** | (2006.01) |
| ***B25G 1/10*** | (2006.01) |
| ***B25G 3/12*** | (2006.01) |

(Continued)

(52) U.S. Cl.

CPC ................. *B25G 3/12* (2013.01); *B25G 1/10* (2013.01); *B25D 1/04* (2013.01); *B25D 1/06* (2013.01); *B25D 2250/051* (2013.01); *B25D 2250/105* (2013.01)

(58) Field of Classification Search

CPC . B25D 1/02; B25D 1/045; B25D 1/06; B25D 1/04; B25D 1/12; B25D 2250/051; B25D 2250/105; B25G 1/01; B25G 1/10; B25G 1/102; B25G 3/32; B25G 3/12

USPC .......... 81/20, 489; 16/110.1, 430; 173/162.2

See application file for complete search history.

(56) References Cited

U.S. PATENT DOCUMENTS

| | | | | | |
|---|---|---|---|---|---|
| 2,615,247 | A | | 10/1952 | Waters | |
| 5,299,475 | A | * | 4/1994 | Stroop ..................... | B25G 3/34 81/20 |

(Continued)

FOREIGN PATENT DOCUMENTS

| | | |
|---|---|---|
| CN | 204604249 | 9/2015 |
| DE | 1791640 | 7/1959 |

(Continued)

OTHER PUBLICATIONS

Stilettto Hammers and axes; retrieved from: https://www.stiletto.com/hammers-axes (Year: 2025).*

(Continued)

*Primary Examiner* — Mahdi H Nejad

(74) *Attorney, Agent, or Firm* — Reinhart Boerner Van Deuren s.c.

(57) ABSTRACT

A tool, such as a hammer including a handle configured to be replaceable is shown. In one embodiment, the handle includes a grip insert coupled to the shaft of the hammer and an outer grip surrounding the grip insert. In another embodiment, the hammer includes a shaft with a pair of opposing channels. The handle includes a grip insert with a pair of corresponding projections to couple to the pair of opposing channels and an outer grip surrounding the grip insert.

16 Claims, 30 Drawing Sheets

(51) Int. Cl.

| | |
|---|---|
| *B25D 1/04* | (2006.01) |
| *B25D 1/06* | (2006.01) |

(56) References Cited

U.S. PATENT DOCUMENTS

| | | | | | |
|---|---|---|---|---|---|
| 5,581,845 | A * | 12/1996 | Yang | B25G 1/102 16/DIG. 12 |
| 5,588,343 | A * | 12/1996 | Rust | B25G 1/102 81/22 |
| 5,640,741 | A | 6/1997 | Yano | |
| 5,845,364 | A * | 12/1998 | Chen | B25G 1/01 16/DIG. 18 |
| 5,926,911 | A * | 7/1999 | Chen | B25G 1/01 81/22 |
| 6,149,538 | A * | 11/2000 | Tiura | B25G 1/01 473/549 |
| 6,196,088 | B1 * | 3/2001 | Youngren | B25D 1/00 81/492 |
| 6,386,070 | B1 * | 5/2002 | Hong | B25G 3/36 81/20 |
| 6,619,408 | B1 * | 9/2003 | Lai | B25G 1/01 81/22 |
| 7,204,957 | B2 | 4/2007 | Tozer | |
| 7,458,902 | B2 | 12/2008 | Gill | |
| 9,278,437 | B2 | 3/2016 | Rakaczki et al. | |
| 9,643,311 | B1 * | 5/2017 | Cowie | B25G 1/04 |
| 10,688,649 | B1 * | 6/2020 | Downey | B25G 1/102 |
| 11,819,992 | B2 * | 11/2023 | Liou | B25G 1/10 |
| 2005/0235447 | A1 | 10/2005 | Wang | |
| 2008/0148524 | A1 | 6/2008 | Wiker et al. | |
| 2008/0235913 | A1 | 10/2008 | Eicher et al. | |
| 2013/0248089 | A1 | 9/2013 | Su et al. | |
| 2015/0107417 | A1 * | 4/2015 | LaPorte | B25D 1/06 81/20 |
| 2019/0118052 | A1 * | 4/2019 | Arrington | A63B 53/14 |
| 2022/0024023 | A1 * | 1/2022 | Liou | B25G 1/00 |

FOREIGN PATENT DOCUMENTS

| | | |
|---|---|---|
| EP | 0508972 | 10/1992 |
| EP | 3187404 | 5/2018 |
| ES | 1054632 | 12/2003 |
| FR | 2619170 | 2/1989 |
| GB | 2074695 | 2/1985 |
| KR | 20-0415829 | 5/2006 |

OTHER PUBLICATIONS

International Search Report and Written Opinion for International Application No. PCT/US2023/062407, dated Jun. 8, 2023, 11 pages.

* cited by examiner

HAND TOOL WITH REPLACEABLE HANDLE

CROSS-REFERENCE TO RELATED PATENT APPLICATIONS

The present application is a continuation of International Application No. PCT/US2023/062407, filed Feb. 10, 2023, which claims the benefit of and priority to U.S. Provisional Application No. 63/309,144 filed on Feb. 11, 2022, which are incorporated herein by reference in their entireties.

BACKGROUND OF THE INVENTION

The present invention relates generally to the field of tools. The present invention relates specifically to a hand tool (hammer, screwdrivers, pry bars, axes, files, wood lathe tools, knives, machetes, etc.) with a grip or handle configured to be replaceable and improve the life of the hand tool.

SUMMARY OF THE INVENTION

One embodiment of the invention relates to a hammer including a head, a shaft, and a replaceable handle. The head includes a striking portion. The shaft is rigidly coupled to the head and extends along a longitudinal axis of the hammer. The replaceable handle is removably couplable to the shaft and includes a grip insert and a grip. The grip insert is coupled to the shaft. The grip is coupled to and at least partially surrounds the grip insert. A radially outward facing surface of the shaft engages the grip insert to resist rotation of the replaceable handle relative to the shaft during use of the hammer.

Another embodiment of the invention relates to a hammer including a head, a shaft, and a replaceable handle. The shaft is rigidly coupled to the head and extends along a longitudinal axis of the hammer. The replaceable handle is coupled to the shaft and includes a grip insert and a grip. The grip insert is coupled to the shaft and includes a first end and a second end. The first end is positioned between the head and the second end. The grip is coupled to the grip insert and surrounds the second end of the grip insert. The grip provides a compressive force on the grip insert such that the replaceable handle securely engages with the shaft.

Another embodiment of the invention relates to a hammer including a head, a shaft, and a replaceable handle. The shaft is coupled to the head and extends along a longitudinal axis of the hammer. The replaceable handle is coupled to the shaft and includes a grip insert, a grip, and a fastener. The grip insert is coupled to the shaft and includes a first end and a second end. The first end is positioned between the head and the second end. The grip is coupled to the grip insert. The fastener extends through the second end of the grip insert along the longitudinal axis of the hammer to securely couple the replaceable handle to the shaft.

Another embodiment of the invention relates to a hand tool including a head, a shaft rigidly coupled to the head and a replaceable handle. The replaceable handle includes a grip insert coupled to the shaft and a grip coupled to and at least partially surrounding the grip insert. The grip defines at least a majority of the outermost or exterior surface of the replaceable handle. In a specific embodiment, the grip entirely surrounds the grip insert such that the grip defines the entire outermost or exterior surface of the replaceable handle. In a specific embodiment, the shaft has a polygonal shape (e.g., a generally octagonal shape) such that the shaft resists rotation of the grip and grip insert relative to the shaft of the hand tool during use.

Another embodiment of the invention relates to a hand tool including a head, a shaft rigidly coupled to the head and a replaceable handle. The replaceable handle includes a grip insert coupled to the shaft and a grip coupled to the grip insert and/or the shaft. The shaft includes a longitudinal channel extending along a longitudinal axis of the hand tool. The grip insert includes a projection configured to engage with the longitudinal channel such that the grip insert resists rotation of the grip and grip insert relative to the shaft of the hand tool during use. In a specific embodiment, the shaft includes a pair of longitudinal channels and the grip insert includes a pair of projections.

In a specific embodiment, a fastener positioned along the longitudinal axis of the hand tool couples the grip insert to the shaft of the hand tool at a gripping end. The grip entirely encloses and/or surrounds the fastener and the gripping end of the grip insert such that replaceable handle securely attaches to the shaft of the hand tool and provides impact resistance during a forceful impact to the hand tool.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
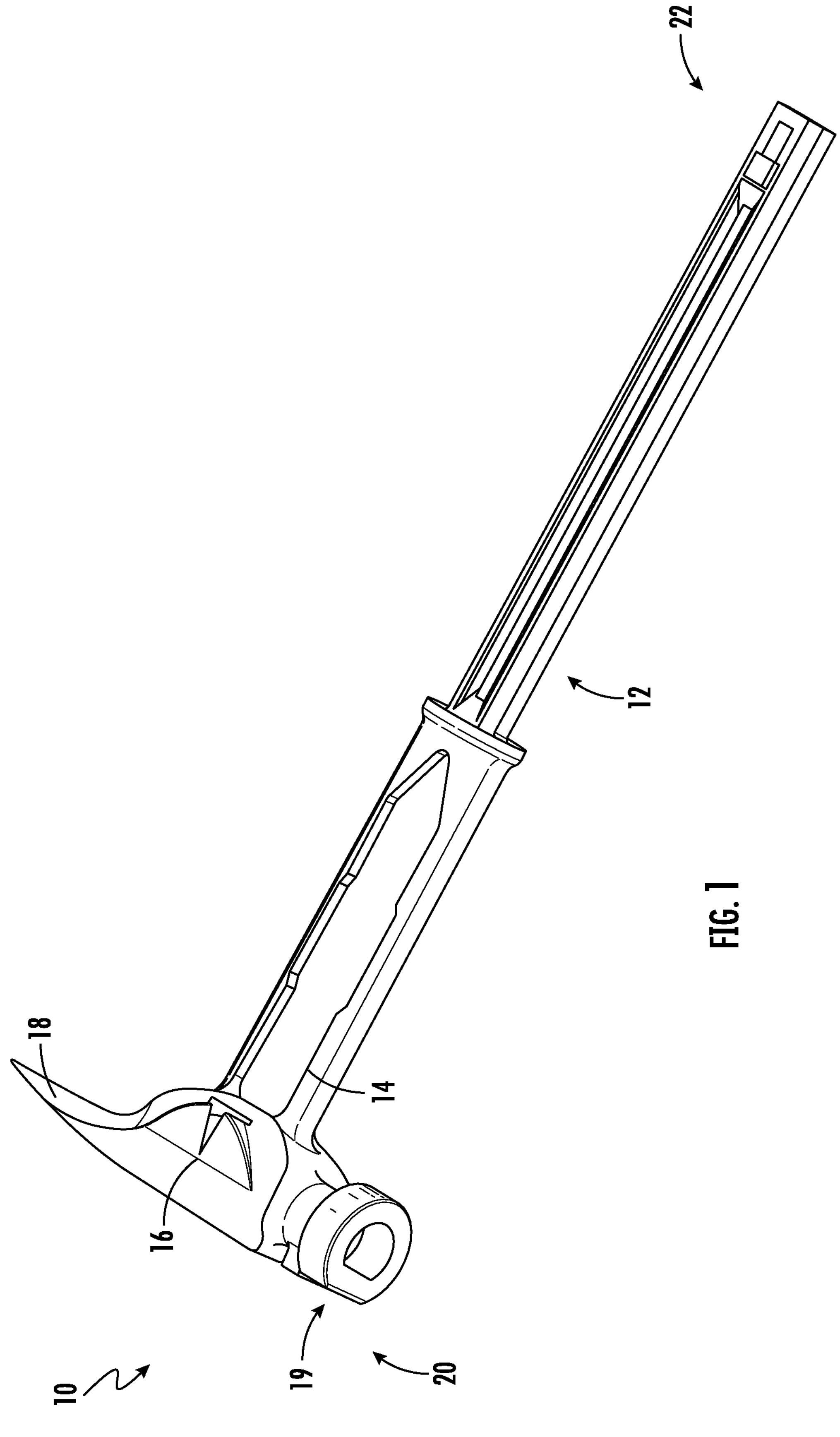
FIG. 1 is a top perspective view of a hammer with a handle removed, according to an exemplary embodiment.

Referring generally to the figures, various embodiments of a hand tool, specifically a hammer, are shown. Various embodiments of the hand tool discussed herein include an innovative replaceable handle. The replaceable handle is designed to have an improved interface or engagement between the grip or handle and the shaft of the hand tool. In contrast to the replaceable handle discussed herein, replaceable handles may have insufficient engagement with the hand tool shaft such that efficiency of the tool may be decreased because the grip may twist or rotate relative to the shaft of the tool during use of the hand tool. For example, this rotation of the grip may decrease the force applied to a workpiece when a hammer is used to strike the workpiece. Similarly, this unwanted grip rotation may decrease the effectiveness of other types of hand tools. For example, when the hand tool is a screwdriver, the grip rotation may decrease the torque applied to the workpiece.

Various embodiments discussed herein relate to a hammer having a generally polygonal cross-sectional shaped shaft, such as an octagonal shaft. In contrast to the frequently used I-beam style hammers, Applicant believes the polygonal shaft shape provides sufficient torque resistance to prevent rotation of the grip relative to the shaft of the hammer (i.e., the replaceable handle stays in line with the frame of the hammer) such that the hammer provides suitable force on a workpiece when the hammer is used.

Further, Applicant believes incorporating a channel or pair of longitudinal (e.g., along the major axis of the shaft) channels into the shaft of the hammer in combination with corresponding protrusions or anti-rotational stiffening ribs on the inner surfaces of the grip insert additionally reduces and/or prevents undesired rotation or the grip relative to the hammer. When assembled, the protrusions of the grip are received within the channels of the shaft providing additional resistance to prevent rotation of the grip relative to the shaft of the hammer. In various embodiments discussed herein, a system preventing incorrect assembly of the replaceable grip and hammer. In a specific embodiment, the shaft of the hammer includes a projection and the grip insert and/or grip include a channel to receive the projection such that the grip cannot be installed on the hammer in a backwards or upside down orientation.

Additionally, the replaceable handle design discussed herein includes a fastener (e.g., bolt, nut, screw, etc.) positioned at the bottom or grip end of the handle to couple the handle to the shank and maintain the position of the replaceable handle. Applicant has found positioning the fastener along the longitudinal axis of the handle provides for a more robust connection between the handle and shaft of the hammer. In contrast to the replaceable handle discussed herein, replaceable handles frequently include a fastener positioned through the shaft in a perpendicular direction to the longitudinal axis of the shaft. Applicant believes the positioning of the fastener helps to better press the grip into the shaft of the hammer such that the position of the grip is maintained when the hammer is used to strike a workpiece.

Another benefit to the positioning of the fastener of the replaceable design handle discussed herein is the ability to tighten and/or retighten the handle to the shaft of the hammer. Fasteners extending in a perpendicular direction to the longitudinal axis of the shaft may wear out and leave a user unable to use the hammer due to the loose nature of the connection. In contrast, Applicant's design allows a user to tighten the fastener if the connection become loose of the handle wears out over time such that the life of the tool and/or replacement handle is extended.

Various embodiments discussed herein relate to a hammer having an outer grip surface surrounding the grip insert including the bottom or grip end of the handle where the fastener is positioned. The outer grip is formed from a different material than the grip insert such as a thermoplastic rubber and is configured to provide secure attachment and retention to hammer, during an impact (e.g., forceful contact from falling objects, dropping of hammer, etc.). In contrast to replaceable handles discussed herein, replaceable handles frequently leave their grip insert formed from a thermoplastic polymer material exposed at the bottom of the handle making them susceptible to damage from forceful contact. Furthermore, Applicant believes the outer grip provides a compressive force on the grip insert and/or shaft of the hammer improving the interface or engagement between the grip or handle and the shaft of the hand tool.

Applicant believes the extension of the outer grip below the bottom face of the grip insert provides improved impact absorption. Further, the positioning of the fastener along the longitudinal axis of the hammer and shaft provides for improved performance because the impact energy is not perpendicular to the bolts.

In other embodiments, the hand tool with the replaceable handle may be a different tool (e.g., screwdrivers, pry bars, axes, files, wood lathe tools, knives, machetes, etc.). Applicant has found, the engagement portion of the tool (e.g., tip, striking surface, etc.) may wear at a reduced rate relative to the handle, such that the life of the tool may be extended if the handle is replaced. Similarly, for a hand tool such as a file, the engagement end that may wear out at an increased rate relative to the handle may be replaced, such that the life of the tool may be extended by repeatedly using the handle with a new file.

Figure 2:
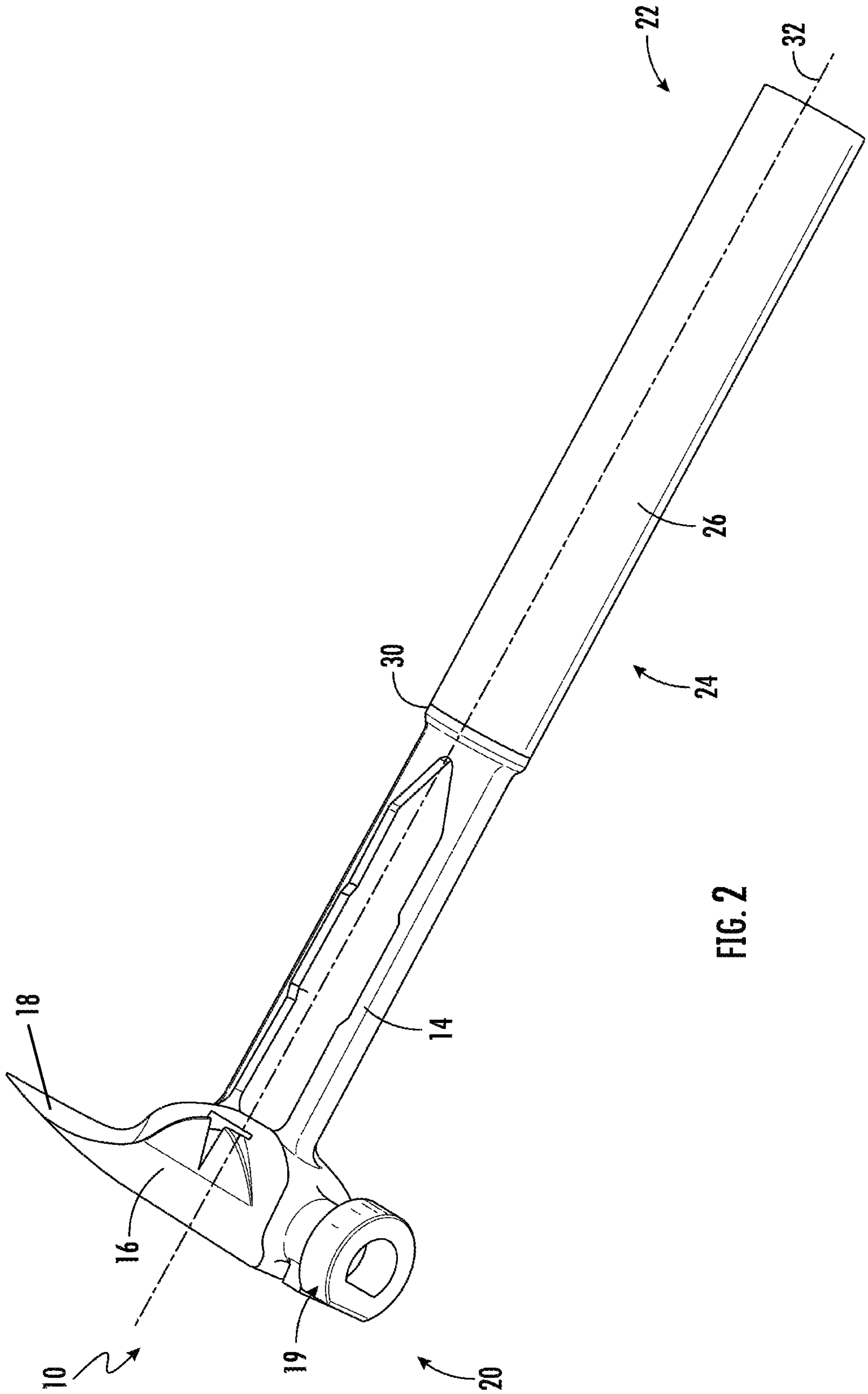
FIG. 2 is a top perspective view of the hammer of FIG. 1, according to an exemplary embodiment.

Referring to FIGS. 1-2, various aspects of a hand tool, shown as a hammer 10, are shown. In general, hammer 10 includes a neck 14, a shaft or body 12 and a head, shown as hammerhead body 16. Hammerhead body 16 includes a claw 18 on an end of the hammerhead body 16 opposing the striking portion 19 of hammerhead body 16. In various embodiments, the striking portion 19 includes a striking surface that may be smooth or textured.

Hammer 10 further includes a striking end 20 including hammerhead body 16 and a gripping end 22 opposing striking end 20. Neck 14 rigidly couples the hammerhead body 16 to shaft 12. Neck 14 and shaft 12 extend from hammerhead body 16 in a generally perpendicular direction along a longitudinal axis 32 of hammer 10. Longitudinal axis 32 extends along the major axis of hammer 10 between striking end 20 and gripping end 22. A base 30 of neck 14 is positioned at an end of neck 14 distal from hammerhead body 16. Base 30 includes a base diameter that is larger than a diameter of shaft 12.

As shown in FIG. 2, a handle, shown as replaceable handle 24 can be coupled to hammer 10 and specifically shaft 12. Replaceable handle 24 includes a grip insert 28 (see e.g., 28 in FIG. 6) and a grip 26, shown schematically. As will be discussed in greater detail below, Applicant has designed replaceable handle 24 to have a more robust connection with shaft 12 to reduce and/or prevent unwanted rotation or twisting of replaceable handle 24 relative to shaft 12 of hammer 10.

Figure 3:
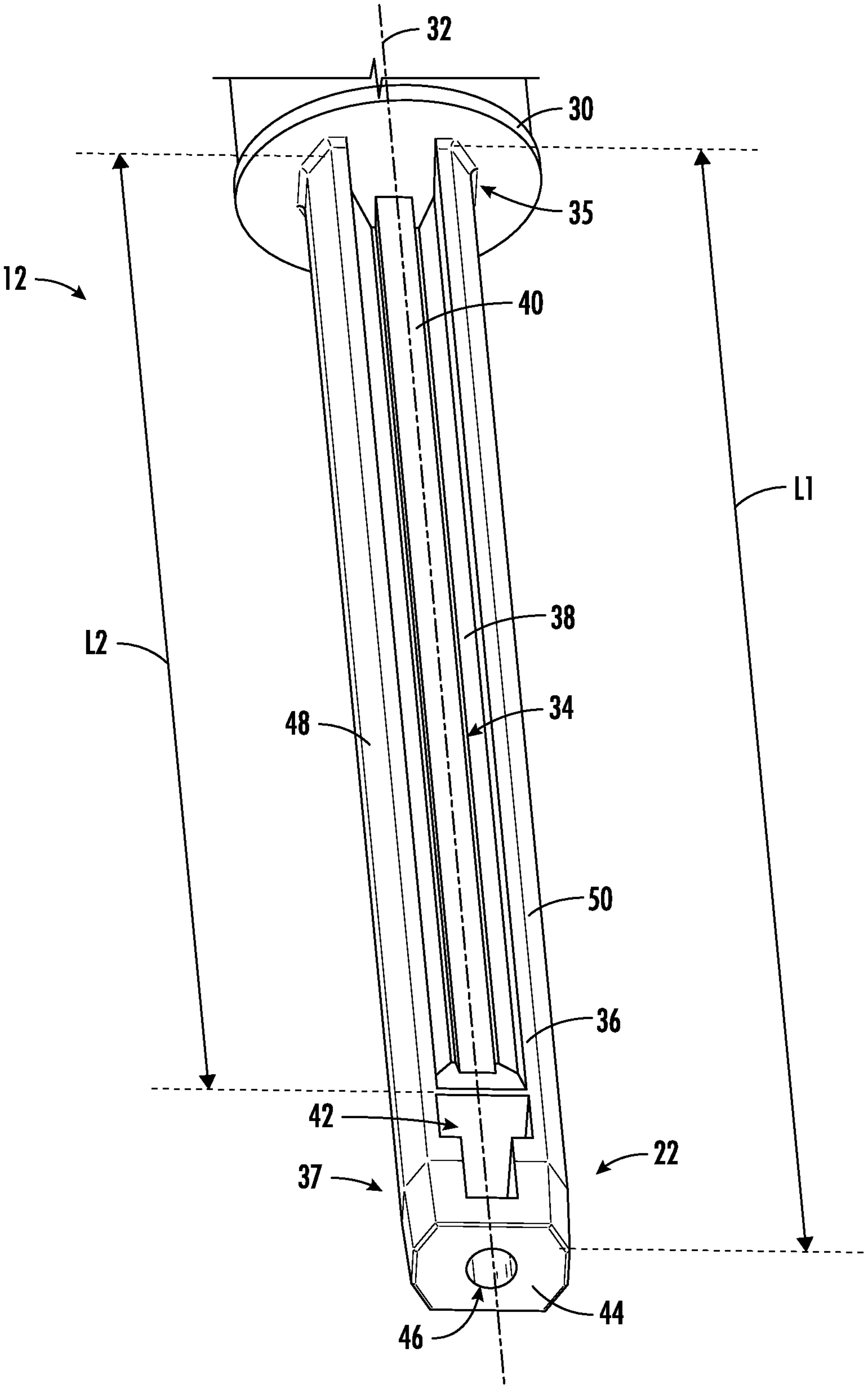
FIG. 3 is a detailed perspective view of a top portion of the shaft of the hammer of FIG. 1, according to an exemplary embodiment.
Figure 4:
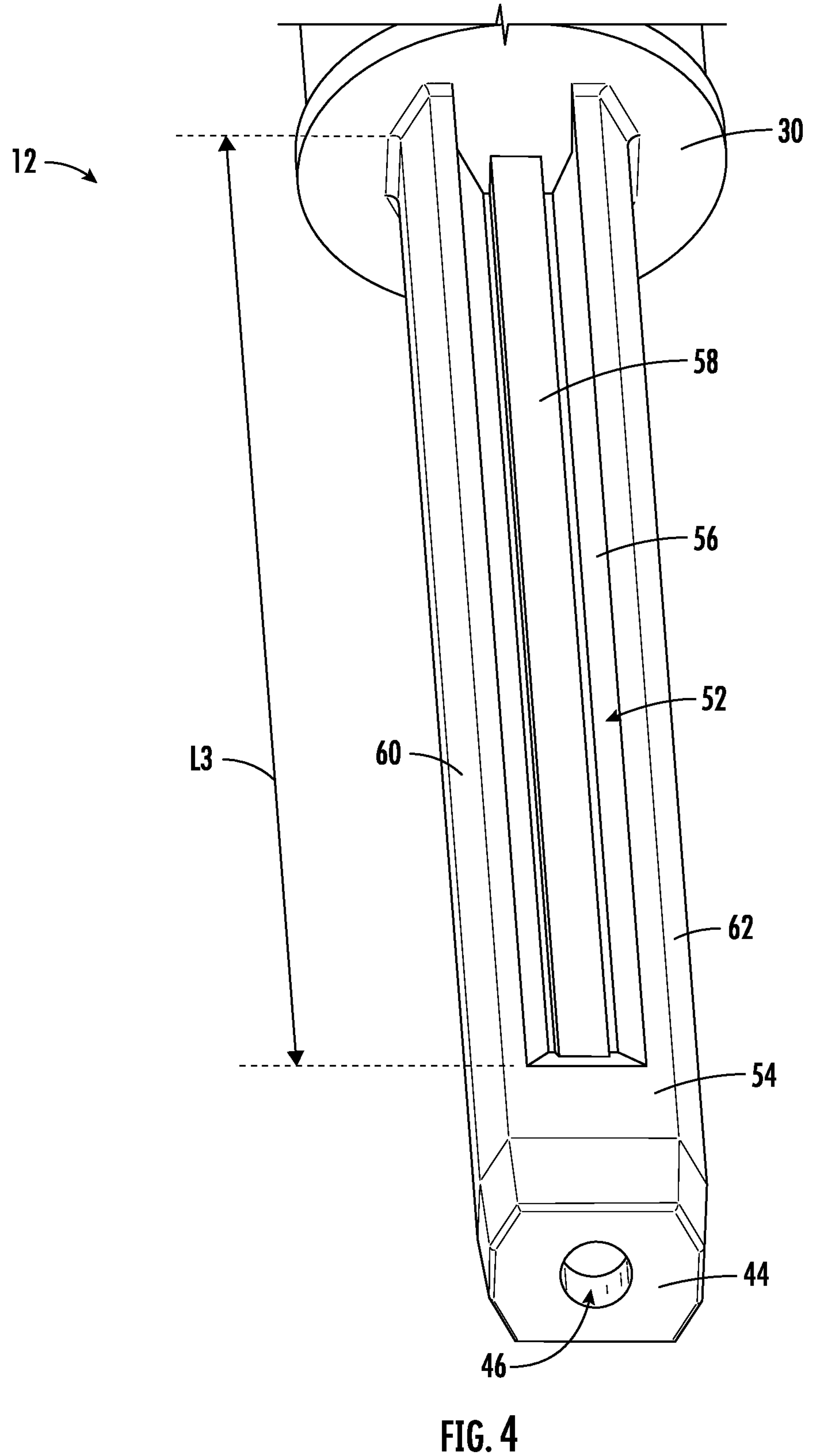
FIG. 4 is a detailed perspective view of a bottom portion of the shaft of the hammer of FIG. 1, according to an exemplary embodiment.

Referring to FIGS. 3-4, a detailed perspective view of the top (in the orientation shown in FIG. 1) of shaft 12 and the bottom of shaft 12 are shown according to an exemplary embodiment. In a specific embodiment, shaft 12 is a polygonal prism such that the cross-sectional shape of shaft 12 is a polygon. In a specific embodiment, the polygonal prism is an octagonal prism such that the cross-sectional shape of shaft 12 is octagonal. In a specific embodiment, shaft 12 is an irregular octagonal prism. In another embodiment, shaft 12 may be another shape (e.g., regular octagonal prism, hexagonal prism, etc.). As noted above, Applicant believes the polygonal (e.g., octagonal) shaft shape provides better torque resistance than typical I-beam shaped shafts to prevent rotation of the grip 26 relative to the shaft 12 of hammer 10 (i.e., the replaceable handle 24 stays in line with the frame of hammer 10) such that the hammer provides suitable force on a workpiece during use. Specifically, in this embodiment, a radially outward facing outer surface of the shaft 12 having a polygonal cross-sectional shape engages the grip insert 28 to resist rotation of grip 26, grip insert 28 and/or replaceable handle 24 relative to shaft 12 during use of hammer 10.

In a specific embodiment, shaft 12 includes a first channel 34 defined in a top surface 36 of shaft 12 and a second channel 52 defined in a bottom surface 54 (in the orientation shown in FIG. 1). First channel 34 and second channel 52 each extend along longitudinal axis 32 and are positioned between base 30 and an end surface 44. In other embodiments, the shaft may not include channels extending along the shaft. In other words, in a specific embodiment, a pair of opposing channels 34, 52 are defined in shaft 12 with the opposing channels 34, 52 extending along the longitudinal axis 32 of hammer 10. As will be discussed in greater detail below, in such an embodiment, a pair of projections on grip insert 28 are positioned within and engaged with opposing channels 34, 52 when replaceable handle 24 is coupled to shaft 12.

First channel 34 and second channel 52 each extend along a length, L1, of shaft 12. L1 is defined between base 30 and end surface 44 of shaft 12. A length of first channel 34, L2, is defined between a first end 35 of shaft 12 adjacent to base 30 and a second end 37 of shaft 12 opposing the first end of shaft 12. In a specific embodiment a length, L3, of second channel 52 is the same as the length, L2, of first channel 34. In other embodiments, L3 may be different than L2. In a specific embodiment, first channel 34 and second channel 52 each extend along a majority of shaft 12 such that L2 and L3 are at least 50% of L1. In a specific embodiment, L2 and L3 are between 50% and 99% of L1, specifically between 70% and 99% of L1, more specifically between 85% and 90% of T1 and in such embodiments L2 and L3 are about 6.54 inches (e.g., 6.54 inches ±0.65 inches).

First channel 34 includes a channel surface 38 positioned between and connected to opposing sides of top surface 36. A first channel projection 40 is coupled to and extends outward from channel surface 38 (e.g., towards top surface 36). In a specific embodiment, first channel projection 40 is a generally a rectangular prism shape. In other embodiments, the first channel projection may have another shape (e.g., triangular prism, hexagonal prism, polygonal prism etc.). The first channel projection 40 is configured to be received by a recess in the grip insert with a shape generally corresponding to the first channel projection 40 (see e.g., 108 in FIG. 9).

Second channel 52 includes a channel surface 56 positioned between and connected to opposing sides of bottom surface 54. A second channel projection 58 is coupled to and extends outward from channel surface 56 (e.g., towards bottom surface 54). In a specific embodiment, second channel projection 58 is generally a rectangular prism shape. In other embodiments, the second channel projection may have another shape (e.g., triangular prism, hexagonal prism, polygonal prism etc.). The second channel projection 58 is configured to be received by a recess in the grip insert with a shape generally corresponding to the second channel projection 58 that opposing the recess configured to receive the first channel projection 40 (see e.g., 108 in FIG. 9).

Referring to FIG. 3, top surface 36 further includes a fastening recess 42. Fastening recess 42 is configured to receive at least a portion of a fastener (e.g., bolt, nut, screw, etc.). Fastening recess 42 is positioned adjacent to second end 37 of shaft 12 between first channel 34 and end surface 44. End surface 44 is generally perpendicular to top surface 36 and bottom surface 54 (e.g., 90°±10°). End surface 44 includes a bore 46. Bore 46 is connected to fastening recess 42 and configured to receive at least a portion of the fastener (e.g., bolt, nut, screw, etc.) such that shaft 12 can be coupled to the grip insert 28 and/or replaceable handle 24. In a specific embodiment, bore 46 is aligned with longitudinal axis 32.

Shaft 12 further includes a first upper angled surface 48 and a second upper angled surface 50 connected to top surface 36 on opposing sides. Similarly, a first lower angled surface 60 and a second lower angled surface 62 are connected to bottom surface 54 on opposing sides. A first side connecting surface 64 (see e.g., FIG. 5) is positioned between and connected to second upper angled surface 50 and first lower angled surface 60. A second side connecting surface 66 (see e.g., FIG. 5) is positioned between and connected to first upper angled surface 48 and second lower angled surface 62.

Figure 5:
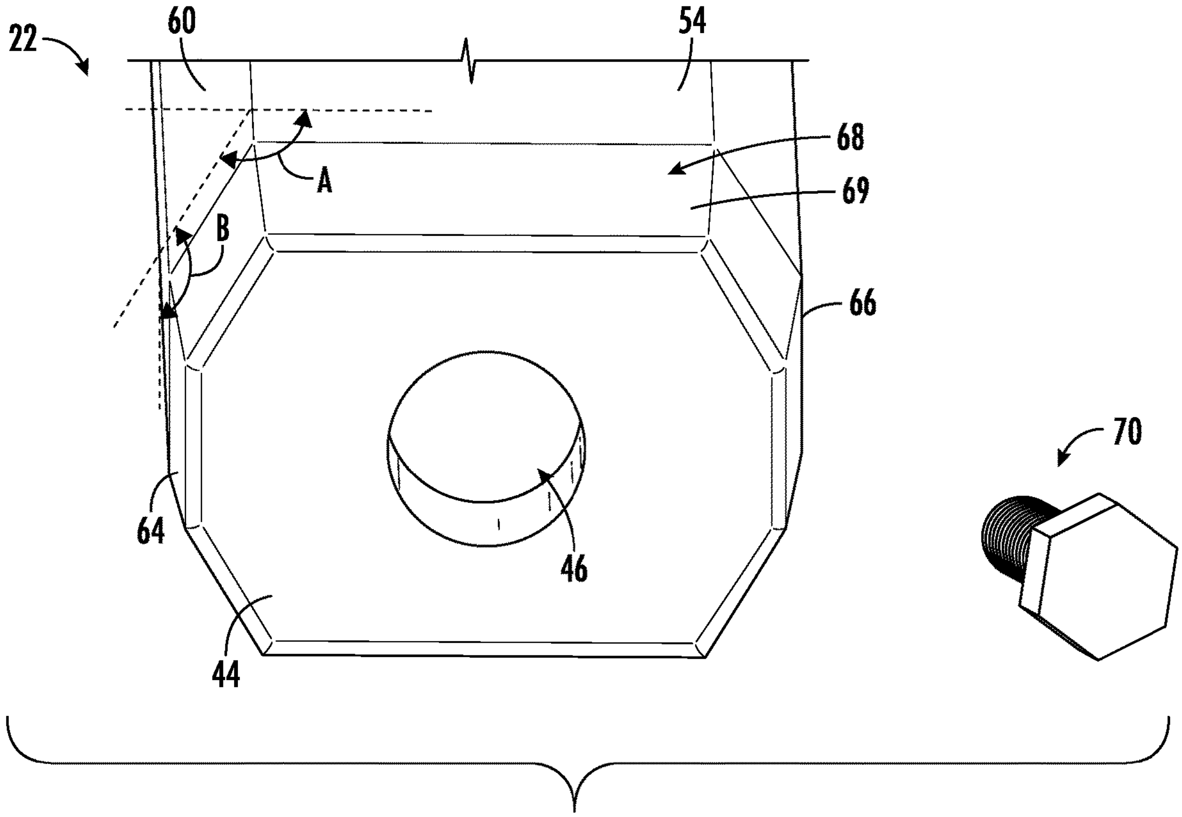
FIG. 5 is a detailed perspective view of the end portion of the shaft of the hammer of FIG. 1, according to an exemplary embodiment.

Referring to FIG. 5, a detailed perspective view of gripping end 22 is shown according to an exemplary embodiment. A fastener, shown as a bolt 70 can be used to securely couple hammer 10 and specifically shaft 12 to replaceable handle 24. When bolt 70 is positioned within grip insert 28 and shaft 12 and tightened, a force is exerted on grip insert 28 such that grip insert 28 will be pressed against shaft 12 (e.g., end surface 44, top surface 36, bottom surface 54, etc.). In another embodiment, a different type of fastener may be used (e.g., nut, screw, etc.). In a specific embodiment a nut is used with bolt 70. In another embodiment, shaft 12 includes a threaded portion such that bolt 70 can be used without a nut.

Referring to FIGS. 3-5, the radially outward facing outer surface of the shaft 12 engages the grip insert 28 to resist rotation of grip 26, grip insert 28 and/or replaceable handle 24 relative to shaft 12 during use of hammer 10. The radially outward facing outer surface of shaft 12 includes at least a portion of top surface 36 and bottom surface 54, first upper angled surface 48, second upper angled surface 50, first lower angled surface 60, second lower angled surface 62, first side connecting surface 64 and second side connecting surface 66. The radially outward facing outer surface of shaft 12 extends along a length of shaft 12. In various specific embodiments, at least portions of the radially outward facing outer surface including surfaces 48, 50, 60, 62, 64 and 66 extend contiguously along the entirety of L1. In various embodiments, at least portions of the radially outward facing surface including at least surfaces 48, 50, 60, 62, 64 and 66 extend contiguously for at least 70% of the length L1, specifically for at least 80% of the length L1, and more specifically for at least 90% of the length of L1.

In other words, instead of single planar side surfaces (e.g., of a hammer shaft with a rectangular or square cross-sectional shape), shaft 12 includes multiple faceted (i.e., more than one face or surface) side surfaces positioned at non-ninety degree angles relative to each other. For example, instead of having a single, planar side surface, the combination of first lower angled surface 60, first side connecting surface 64 and second upper angled surface 50 forms a side (i.e., portion of outer surface extending between top surface 36 and bottom surface 54) or portion of the radially outward facing outer surface of shaft 12. Similarly, the opposing side surface is faceted or a combination of second lower angled surface 62, second side connecting surface 66, and first upper angled surface 48. In various specific embodiments, the side surfaces of shaft 12 include three components or faces. In various other embodiments the side surfaces of shaft 12 includes a different number or components or faces (i.e., 2, 4, 5 etc.).

In various specific embodiments, the radially outward facing outer surface of shaft 12 defines the outer surface of a polygonal prism. In such embodiments, a shape of a cross-section of shaft 12 taken perpendicular to a longitudinal axis of shaft 12 is polygonal (specifically a non-rectangular polygon having more than four sides) such that shaft 12 resists rotation of grip 26 and grip insert 28 relative to shaft 12 during use of hammer 10.

In various specific embodiments, the radially outward facing outer surface of shaft 12 defines the outer surface of a polygonal prism that is an octagonal prism. In such an embodiment, at least a portion of shaft 12 is an octagonal prism. In such embodiments, a shape of a cross-section of shaft 12 taken perpendicular to a longitudinal axis of shaft 12 is octagonal (i.e., a complete octagon) such that shaft 12 resists rotation of grip 26 and grip insert 28 relative to shaft 12 during use of hammer 10. In another specific embodiment, the polygonal prism is a convex polygonal prism (i.e., none of the vertices of the shape are pointed inward). In other words, the interior angles of the polygonal prism are less than 180 degrees. In various specific embodiments the longitudinal axis of shaft 12 extends in a parallel orientation to longitudinal axis 32 of hammer 10. In a specific embodiment, the longitudinal axis of shaft 12 is collinear with longitudinal axis 32 of hammer 10.

In various specific embodiments in which shaft 12 includes a first channel 34 and/or a second channel 54 the outer surface of shaft 12 defines an outer surface of a polygonal prism such as an irregular polygonal prism. In such an embodiment, the outer surface of shaft 12 includes a portion of top surface 36, a portion of bottom surface 54, first upper angled surface 48, second upper angled surface 50, first lower angled surface 60, second lower angled surface 62, first side connecting surface 64 and second side connecting surface 66 and additionally channel surface 38. Channel surface 38 includes a first downward extending portion (i.e., generally perpendicular to top surface 36) that continues into a first angled portion that connects to the outward facing surface of channel projection 40.

The outer surface of channel projection 40 includes an upward extending surface that is generally parallel (i.e., 180 degrees plus or minus 10 degrees), the upward extending surface continues into a upward facing surface that extends in a perpendicular orientation to the upward extending surface. The upward facing surface of channel projection 40 continues and extends into a second upward extending surface that connects to a second angled portion which then connects to a second downward extending portion. Channel surface 38 is symmetrical about a plane centered on channel projection. When shaft 12 includes both first channel 34 and second channel 54, the channel surface 56 is the same as channel surface 38 (i.e., includes the same shape).

In a specific embodiment, gripping end 22 includes a tapered portion 68 between end surface 44 and the first channel 34 or second channel 52. Tapered portion 68 includes a bottom tapered surface 69 that tapers inward (e.g., toward longitudinal axis 32). In a specific embodiment tapered surface 69 is positioned at an angle at between 1° and 10°, specifically between 1° and 5° and more specifically at about 2.86° (e.g., about 2.86°±0.3°. In a specific embodiment, the remaining tapered surfaces that extend from and correspond to top surface 36, first upper angled surface 48, first lower angled surface 60, etc. taper inward at about 2.86° (e.g., about 2.86°±0.3°.

In a specific embodiment, first lower angled surface 60 is positioned at an angle A relative to bottom surface 54. In a specific embodiment, angle A is between 100° and 140°, specifically between 115° and 125° and more specifically at about 120° (e.g., 120°±3°). In a specific embodiment, first side connecting surface 64 is positioned at an angle B relative to first lower angled surface 60. In a specific embodiment, angle B is between 130° and 160°, specifically between 145° and 155° and more specifically at about 150° (e.g., 150°±3°). Similarly, first side connecting surface 64 is positioned at angle B relative to second upper angled surface 50 and second upper angled surface 50 is positioned at angle A relative to top surface 36.

Figure 6:
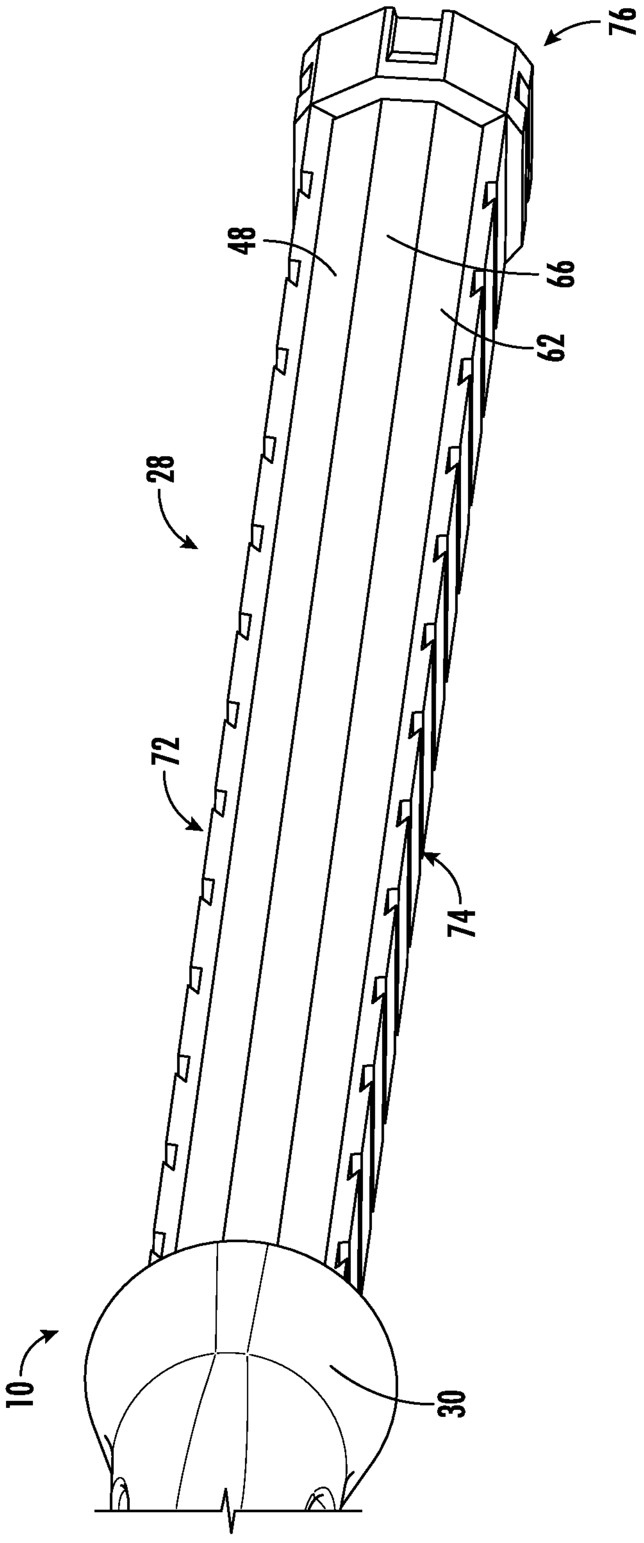
FIG. 6 is a side perspective view of the hammer of FIG. 1 with a grip insert, according to an exemplary embodiment.

Referring to FIG. 6, a side perspective view of shaft 12 received within grip insert 28 is shown according to an exemplary embodiment. Grip insert 28 includes an upper section 72, a lower section 74 (in the orientation shown in FIG. 1) and a grip base or end portion 76. Upper section 72 and lower section 74 extend along longitudinal axis 32 and are each coupled to grip base 76 at opposing sides such that they are positioned facing top surface 36 and bottom surface 54 respectively.

In various embodiments, grip insert 28 is formed from a first material and grip 26 is formed from a second material. In a specific embodiment, the second material is different than the first material. In a specific embodiment, grip insert 28 is formed from a thermoplastic polymer (e.g., polypropylene, polyethylene, acrylonitrile butadiene styrene (ABS), etc.). In a specific embodiment, grip insert 28 is formed from polypropylene. In various embodiments, grip 26 is formed from a thermoplastic elastomer (e.g., thermoplastic vulcanizates (TPVs), thermoplastic styrenic elastomers (TPS), etc.). In a specific embodiment, grip 26 is formed from a thermoplastic vulcanizate such as Santoprene. In a specific embodiment, replaceable handle 24 can be formed using co-injection molding. In other embodiments, replaceable handle 24 may be formed using other methods. Grip 26 provides a compressive force on the grip insert 28 such that the replaceable handle 24 securely engages with the shaft 12.

As noted above and as shown in FIG. 2, grip 26 at least partially surrounds the grip insert 28 including the bottom or grip end of the replaceable handle 24 where the fastener (see e.g., bolt 70) is positioned. Grip 26 defines at least a majority of the outermost or exterior surface of replaceable handle 24. In a specific embodiment, grip 26 entirely surrounds grip insert 28 such that the grip 26 defines the entire outermost or exterior surface of replaceable handle 24. The grip 26 is configured to provide secure attachment and retention to hammer 10, during an impact (e.g., forceful contact from falling objects, dropping of hammer, etc.). In contrast to typical replaceable handles, replaceable handle 24 does not leave grip insert 28 exposed at the gripping end 22 of hammer 10. As such, Applicant believes replaceable handle 24 is less susceptible to damage from forceful contact due to increased impact protection of grip insert 28 and the fastener.

Figure 7:
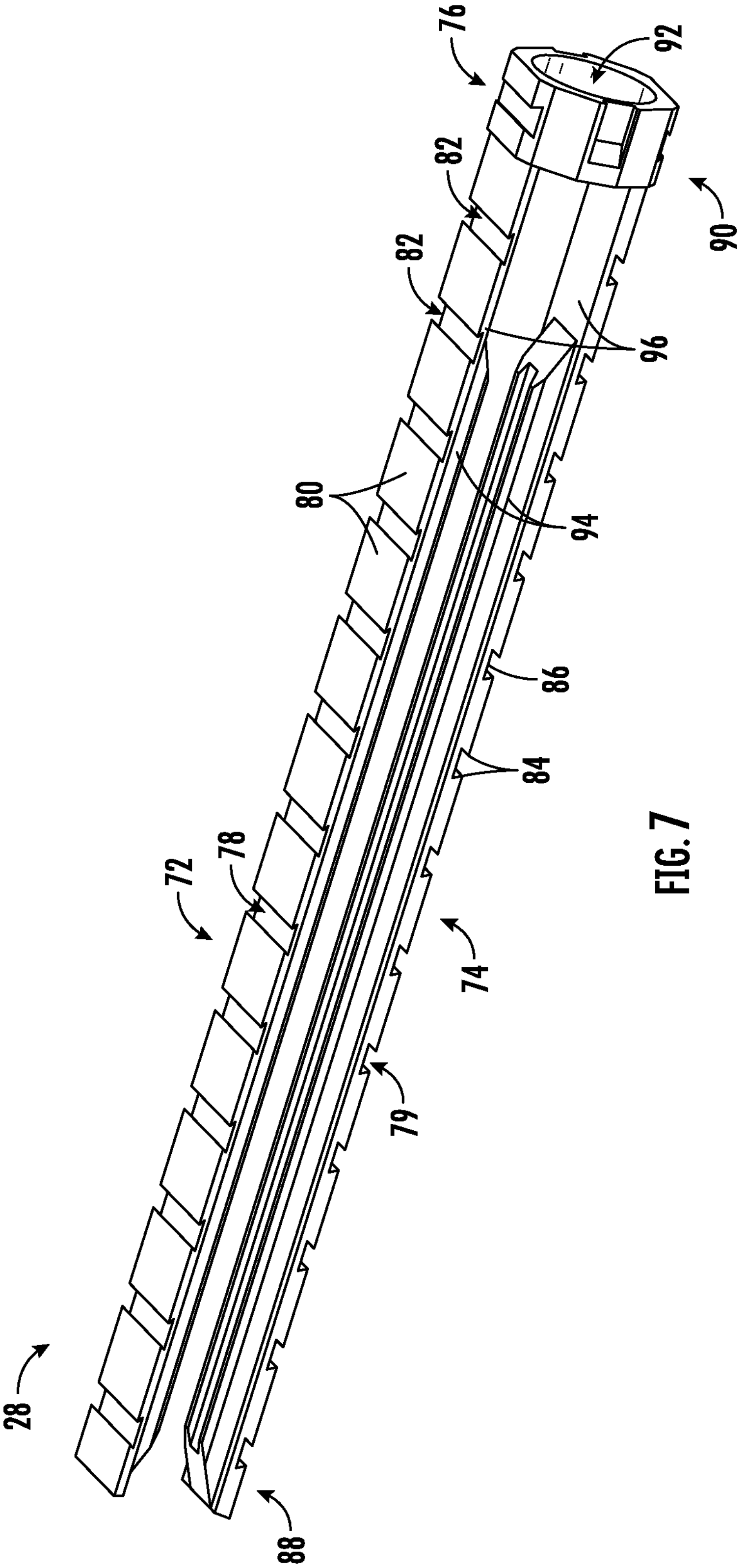
FIG. 7 is a side perspective view of the grip insert of FIG. 6, according to an exemplary embodiment.

Referring to FIG. 7, a side perspective view of the grip insert 28 is shown according to an exemplary embodiment. Upper section 72 and lower section 74 each include an opposing inward facing surface 96. A corresponding projection 94 is a longitudinal projection coupled to each inward facing surface 96. The corresponding longitudinal projections 94 are configured to extend into (i.e., positioned at least partially within) and engage with first channel 34 and second channel 52 respectively when the replaceable handle 24 is assembled. The engagement between corresponding projections 94 and first and second channels 34, 52 of shaft 12 reduces and/or prevents undesired rotation or the grip insert 28 and replaceable handle 24 relative to hammer 10.

Upper section 72 further includes an outward facing surface 78 (e.g., facing away from shaft 12 when assembled). Lower section 74 similarly includes an outward facing surface 79. Outward facing surfaces 78, 79 each include a plurality of projections 80 and a plurality of attachment recesses 82 at least partially defined between adjacent projections 80. In a specific embodiment, attachment recesses 82 have a dovetail shape. In another embodiment, the attachment recesses may have a different shape (e.g., triangular, etc.).

Each projection 80 includes a left attachment portion with an inward facing (i.e., partially facing toward outward facing surface 78 or 79), angled surface 84 and the opposing right attachment portion of projection 80 includes an inward facing (i.e., partially facing toward outward facing surface 78 or 79), angled surface 84. A recess portion 86 of outward facing surface 78 or 79 extends between angled surfaces 84. Recess portion 86 extends parallel to longitudinal axis 32 of hammer 10 when the replaceable handle 24 is assembled. When grip insert 28 is coupled to shaft 12, a first end 88 of grip insert 28 is positioned adjacent to neck 14 and a second end 90 that opposes first end 88 is positioned adjacent to gripping end 22 of hammer 10. Grip base 76 further includes a recess 92 that extends along longitudinal axis 32.

Figure 8:
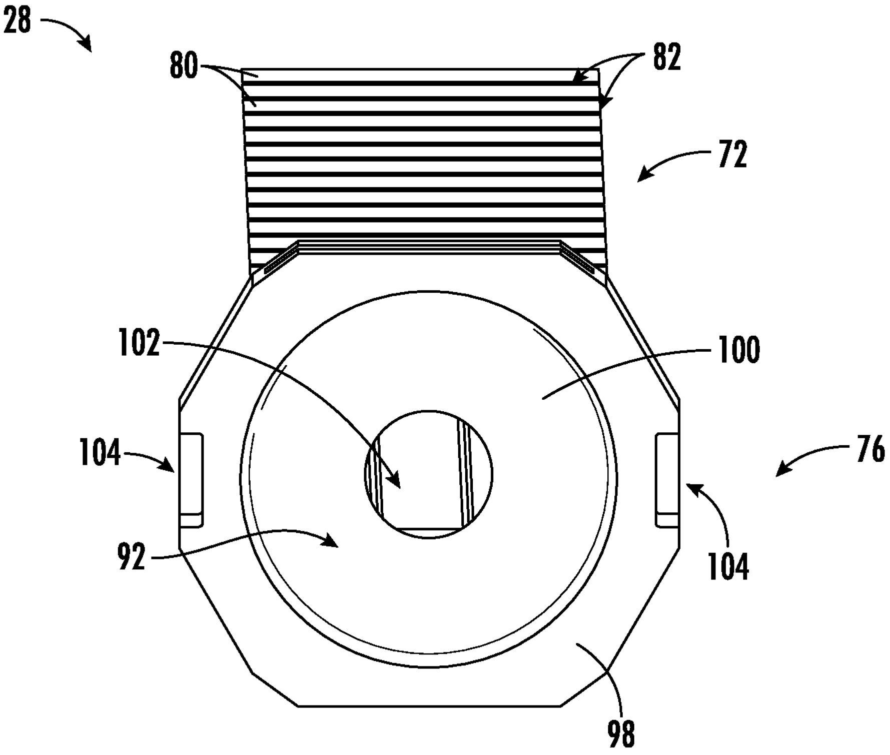
FIG. 8 is a rear perspective view of the grip insert of FIG. 7, according to an exemplary embodiment.
Figure 9:
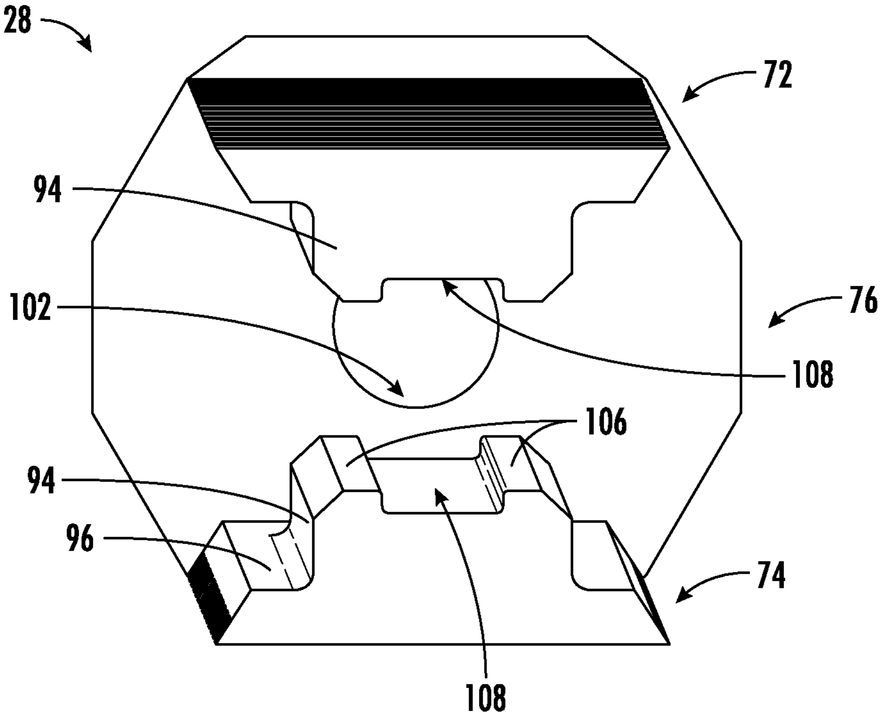
FIG. 9 is a front perspective view of the grip insert of FIG. 7, according to an exemplary embodiment.
Figure 10:
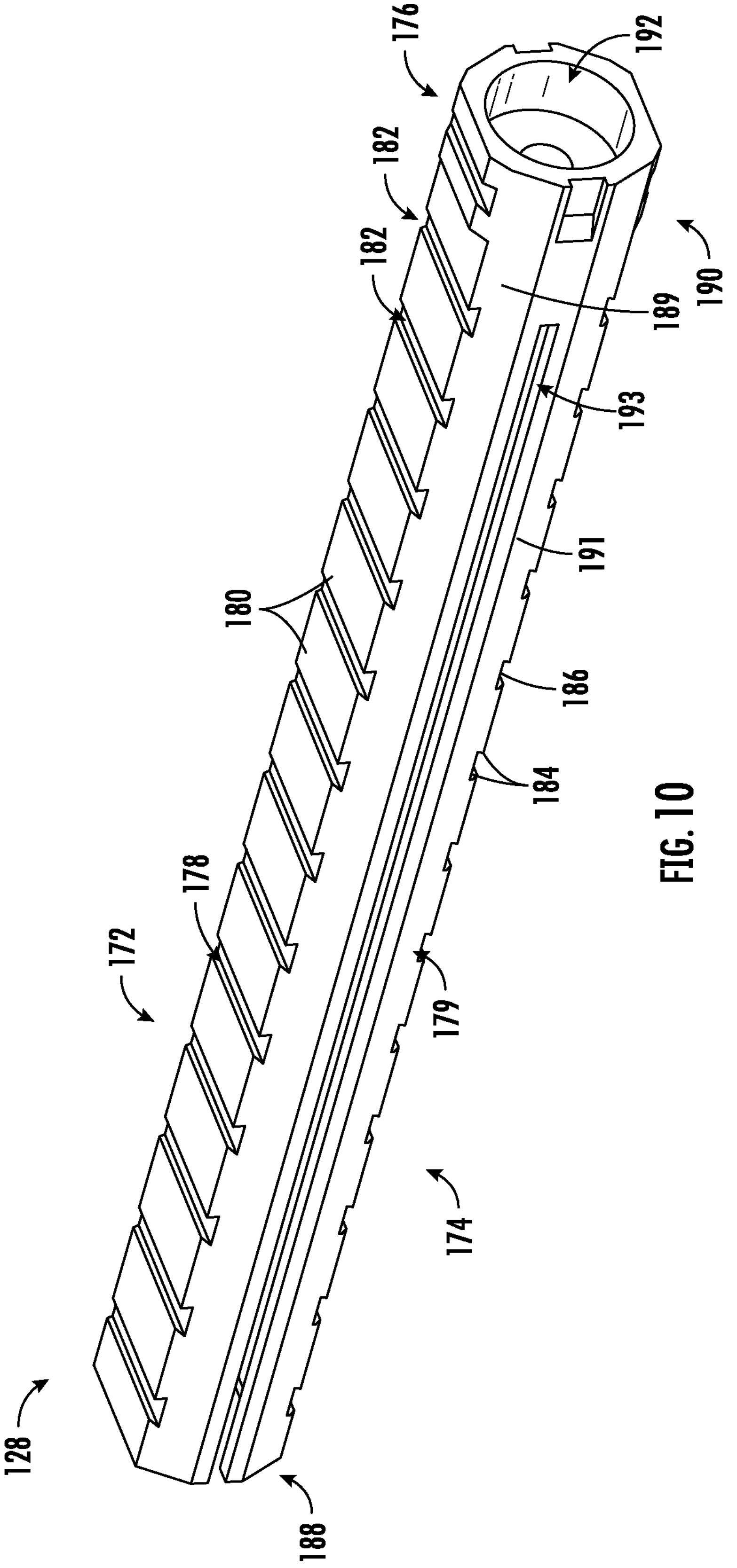
FIG. 10 is a side perspective view of a grip insert, according to another exemplary embodiment.

Referring to FIGS. 8-9, rear and front perspective view of grip insert 28 are shown according to an exemplary embodiment. Grip base 76 further includes an end surface 98 in which recess 92 is defined. Recess 92 includes a lower surface 100. A bore 102 is defined in and extends through lower surface 100 of recess 92. When grip insert 28 is coupled to shaft 12, bore 102 is aligned with bore 46 such that bolt 70 can extend through both bore 102 and bore 46.

A pair of base attachment recesses 104 are defined in grip base 76. Base attachment recesses 104 extend in a generally perpendicular direction to the plurality of attachment recesses 82. Base attachment recesses 104 and attachment recesses 82 offer numerous points for mechanical engagement between grip insert 28 and grip 26 providing for robust attachment between grip insert 28 and grip 26.

As shown in FIG. 9, corresponding projections 94 each include a pair of protrusions 106 that define a longitudinal recess 108. Each longitudinal recess 108 is shaped to receive and engage first channel projection 40 and/or second channel projection 58 while the pair of protrusions 106 are received within first channel 34 and second channel 52. When grip insert 28 is engaged with and/or coupled to shaft 12, the pair of protrusions 106 interact with channel surfaces 38 and 56 along with engagement between longitudinal recess 108 and channel projections 40, 58 to provide additional mechanical resistance to unwanted twisting of replaceable handle 24.

Referring to FIGS. 10-13, various aspects of a grip insert 128 are shown according to an exemplary embodiment. Grip insert 128 can be utilized with hammer 10 and grip 26 to form a replaceable handle 124. In general, grip insert 128 is substantially the same as grip insert 28 except for the differences discussed herein Referring to FIG. 10, a side perspective view of the grip insert 128 is shown according to an exemplary embodiment. Grip insert 128 includes an upper section 172, a lower section 174 (in the orientation shown in FIG. 1) and a grip base or end portion 176. Upper section 172 and lower section 174 extend along longitudinal axis 32 and are each coupled to grip base 176 at opposing sides such that they are positioned facing top surface 36 and bottom surface 54 of shaft 12 respectively.

Upper section 172 further includes an outward facing surface 178 (e.g., facing away from shaft 12 when assembled). Lower section 174 similarly includes an outward facing surface 179. Outward facing surfaces 178, 179 each include a plurality of projections 180 and a plurality of attachment recesses 182 at least partially defined between adjacent projections 180.

Each projection 180 includes a left attachment portion with an inward facing (i.e., partially facing toward outward facing surface 178 or 179), angled surface 184 and the opposing right attachment portion of projection 180 includes an inward facing (i.e., partially facing toward outward facing surface 178 or 179), angled surface 184. A recess portion 186 of outward facing surface 178 or 179 extends between angled surfaces 184. Recess portion 186 extends parallel to longitudinal axis 32 of hammer 10 when the replaceable handle 124 is assembled. When grip insert 128 is coupled to shaft 12, a first end 188 of grip insert 128 is positioned adjacent to neck 14 and a second end 190 that opposes first end 188 is positioned adjacent to gripping end 22 of hammer 10. Grip base 176 further includes a recess 192 that extends along longitudinal axis 32.

In contrast to grip insert 28, upper section 172 and lower section 174 of grip insert 128 include portions that extend over the sides of shaft 12 (see e.g., 189, 191). Upper section 172 includes a pair of upper angled walls 189 connected to and extending downward at an angle (in the orientation shown in FIG. 10) from outward facing surface 178. Lower section 174 similarly a pair of lower angled walls 191 connected to and extending upward at an angle (in the orientation shown in FIG. 10) from outward facing surface 179. When grip insert 128 is coupled to shaft 12, inner surfaces of upper angled walls 189 faces first upper angled surface 48 and second upper angled surface 50 while inner surfaces of lower angled walls 191 faces first lower angled surface 60 and second lower angled surface 62. A pair of openings, shown as slits 193 extend along the longitudinal axis of grip insert 128 and are defined between each upper angled wall 189 and the corresponding lower angled wall 191. When grip insert 128 is coupled to shaft 12, each slit 193 will be at least partially positioned over first side connecting surface 64 and second side connecting surface 66.

Figure 11:
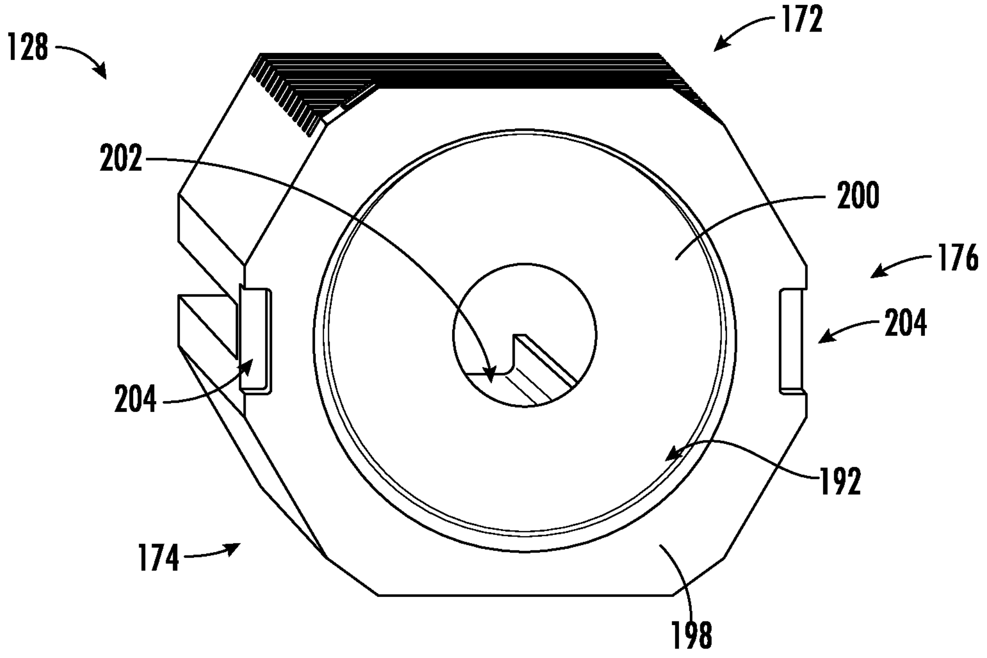
FIG. 11 is a rear perspective view of the grip insert of FIG. 10, according to an exemplary embodiment.
Figure 12:
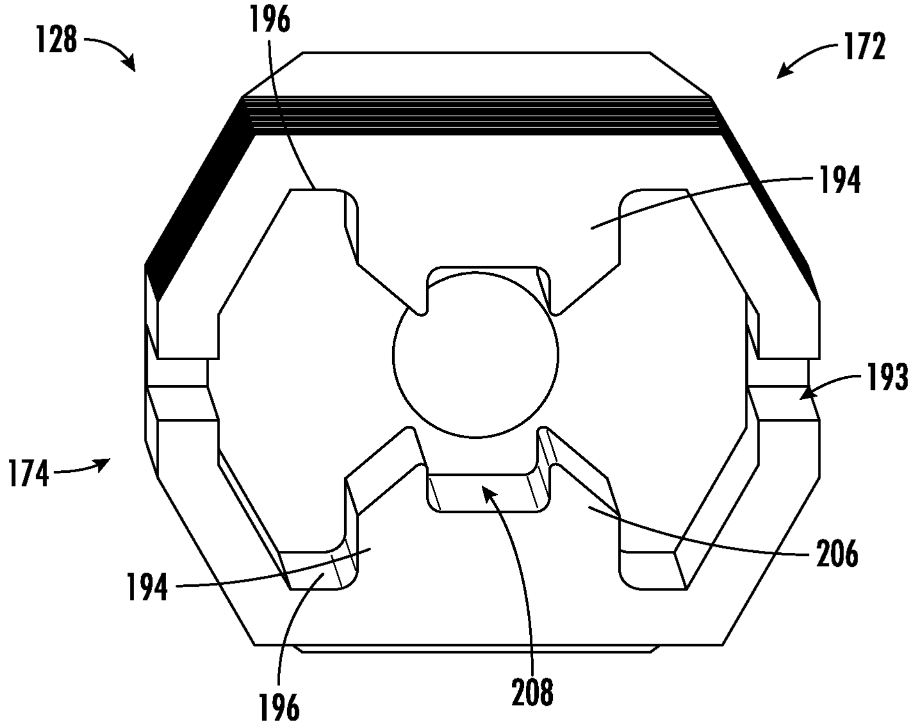
FIG. 12 is a front perspective view of the grip insert of FIG. 10, according to an exemplary embodiment.

Referring to FIGS. 11-12, rear and front perspective view of grip insert 128 are shown according to an exemplary embodiment. Grip base 176 further includes an end surface 198 in which recess 192 is defined. Recess 192 includes a lower surface 200. A bore 202 is defined in and extends through lower surface 200 of recess 192. When grip insert 128 is coupled to shaft 12, bore 202 is aligned with bore 46 such that bolt 70 can extend through both bore 202 and bore 46.

Upper section 172 and lower section 174 each include an opposing inward facing surface 196. A corresponding projection 194 is coupled to each inward facing surface 196. The corresponding projections 194 are configured to engage with first channel 34 and second channel 52 respectively when the replaceable handle 24 is assembled. The engagement between corresponding projections 194 and first and second channels 34, 52 of shaft 12 reduces and/or prevents undesired rotation of the grip insert 128 and replaceable handle 24 relative to hammer 10. In addition, the engagement between upper angled walls 189 and lower angled walls 191 and first upper angled surface 48, second upper angled surface 50, first lower angled surface 60 and second lower angled surface 62 respectively provides additional resistance to twisting.

A pair of base attachment recesses 204 are defined in grip base 176. Base attachment recesses 204 extend in a generally perpendicular direction to the plurality of attachment recesses 182. Base attachment recesses 204 and attachment recesses 182 offer numerous points for mechanical engagement between grip insert 128 and grip 26 providing for robust attachment between grip insert 128 and grip 26.

Figure 13:
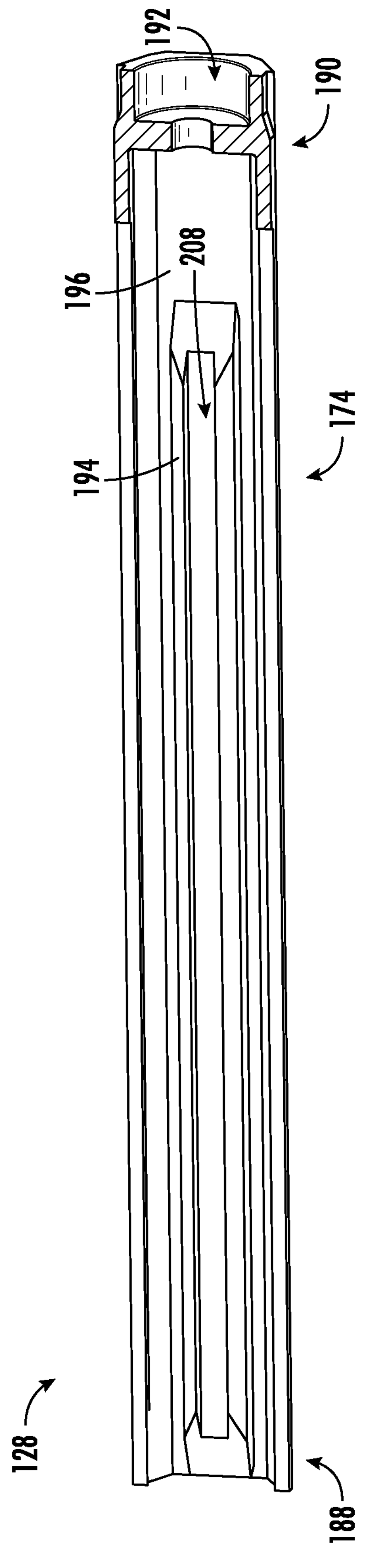
FIG. 13 is a top perspective view of the grip insert of FIG. 10 with the top portion removed, according to an exemplary embodiment.

As shown in FIGS. 12-13, corresponding projections 194 each include a pair of protrusions 206 that define a longitudinal recess 208. Longitudinal recess 208 is shaped to receive and engage first channel projection 40 and second channel projection 58 while the pair or protrusions 206 are received within first channel 34 and second channel 52. When grip insert 28 is engaged with and/or coupled to shaft 12, the pair of protrusions 206 interact with channel surfaces 38 and 56 along with engagement between longitudinal recess 208 and channel projections 40, 58 to provide additional mechanical resistance to unwanted twisting of replaceable handle 124.

Figure 14:
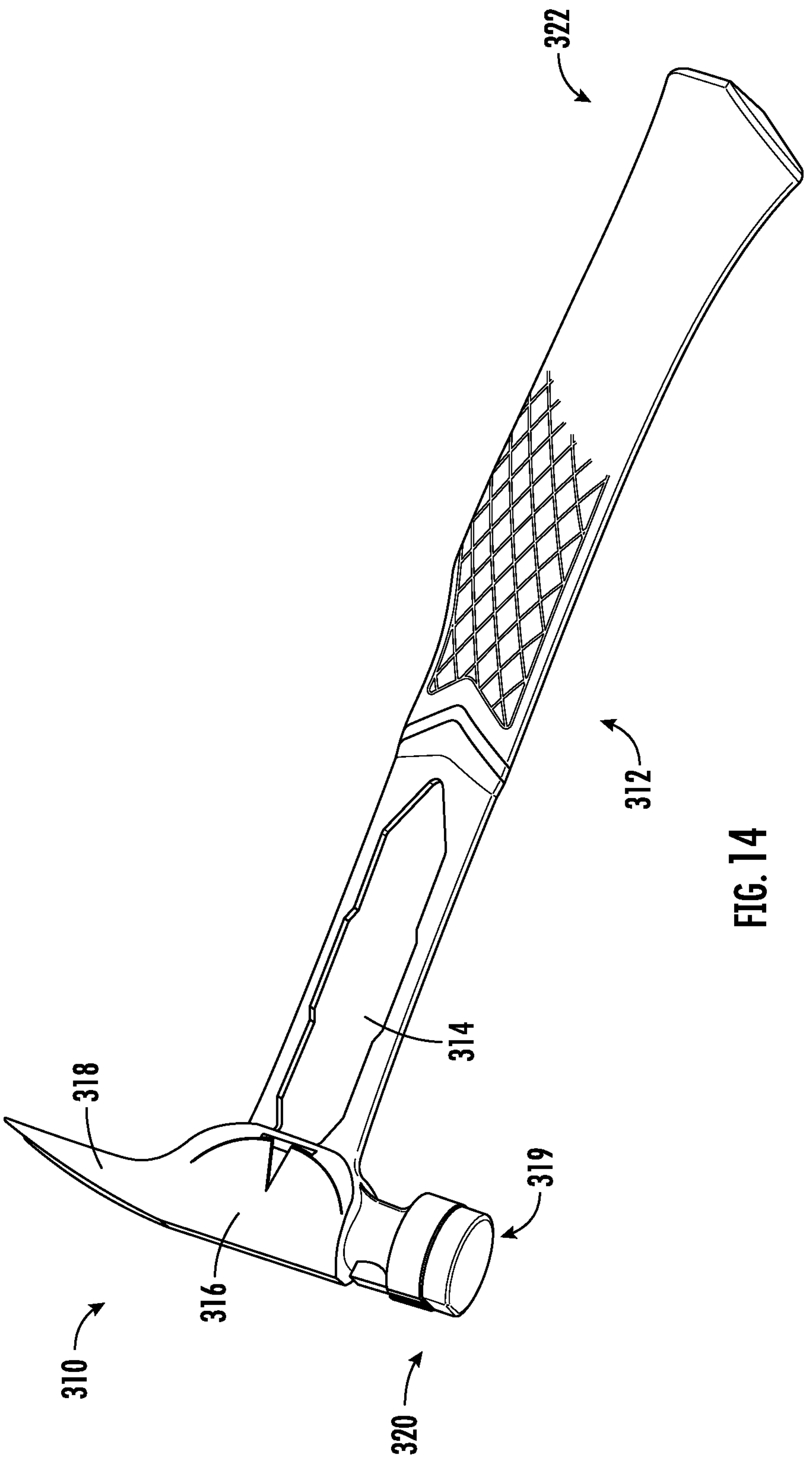
FIG. 14 is a top perspective view of a hammer, according to another exemplary embodiment.
Figure 15:
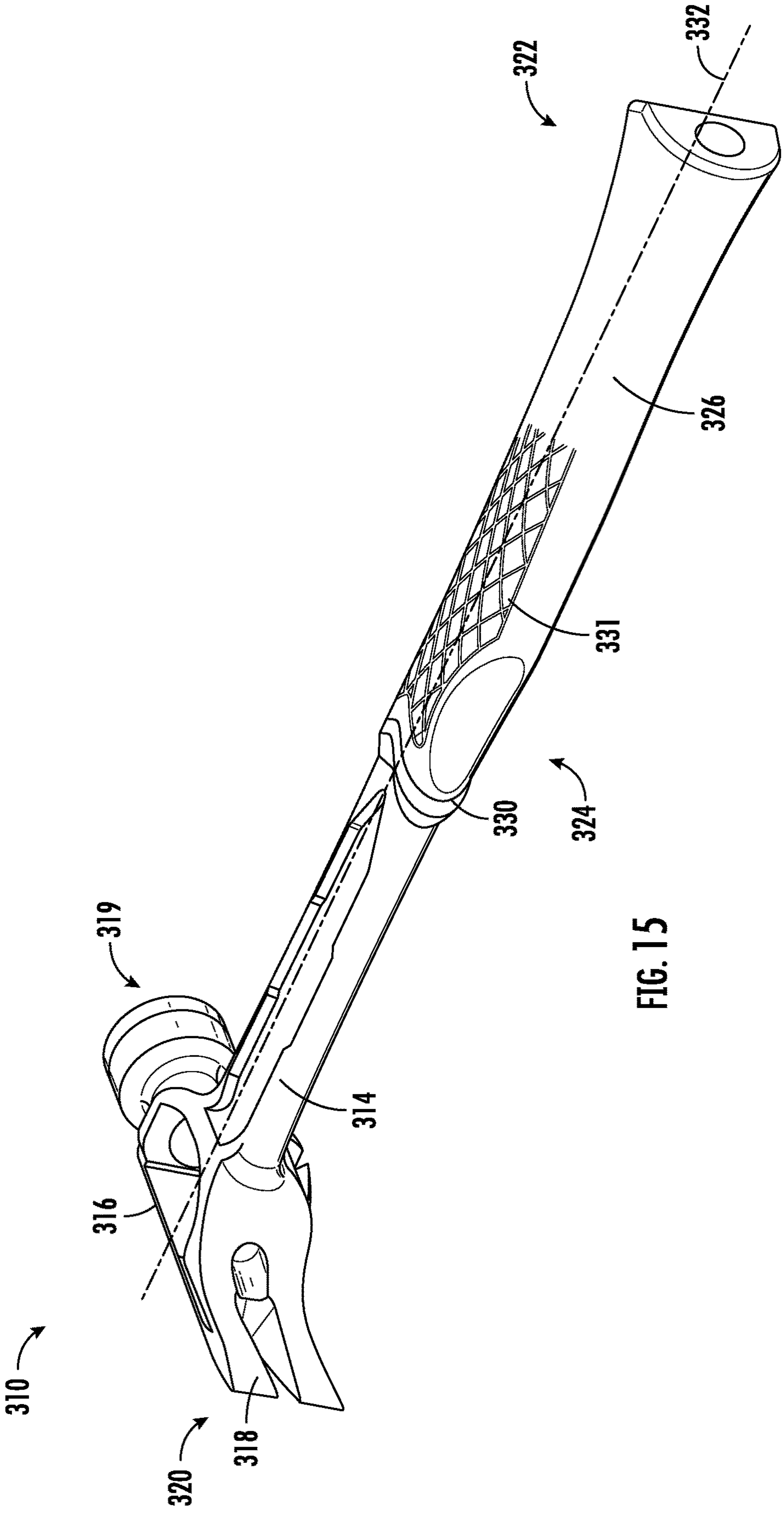
FIG. 15 is a bottom perspective view of the hammer of FIG. 14, according to an exemplary embodiment.

Referring to FIGS. 14-26, various aspects of a hand tool, shown as a hammer 310, are shown. Hammer 310 can be utilized with replaceable handle 24 and/or replaceable handle 124. In general, hammer 310 is substantially the same as hammer 10 except for the differences discussed herein. As shown in FIGS. 14-15, hammer 310 includes a neck 314, a shaft or body 312 and a head, shown as hammerhead body 316. Hammerhead body 316 includes a claw 318 on an end of the hammerhead body 316 opposing the striking portion 319 of hammerhead body 316. In various embodiments, the striking portion 319 includes a striking surface or face that is removable and/or replaceable. A longitudinal axis 332 extends along the major axis of hammer 310 between striking end 320 and gripping end 322.

Hammer 310 includes a handle, shown as replaceable handle 324. In general, replaceable handle 324 is substantially the same as replaceable handle 24 and/or replaceable handle 124 except for the differences discussed herein. In various specific embodiments, grip 326 includes a grip texture and/or roughness 331. Grip texture 331 includes projections and/or recesses that provide grip (i.e., friction between a user's hand and replaceable handle 324). In a specific embodiment, grip 326 defines at least a majority (i.e., greater than 50%) of the outermost or exterior surface of the replaceable handle 324. In various specific embodiments, replaceable handle 324 is formed using overmolding (i.e., grip 326 is molded onto grip insert 328).

Figure 16:
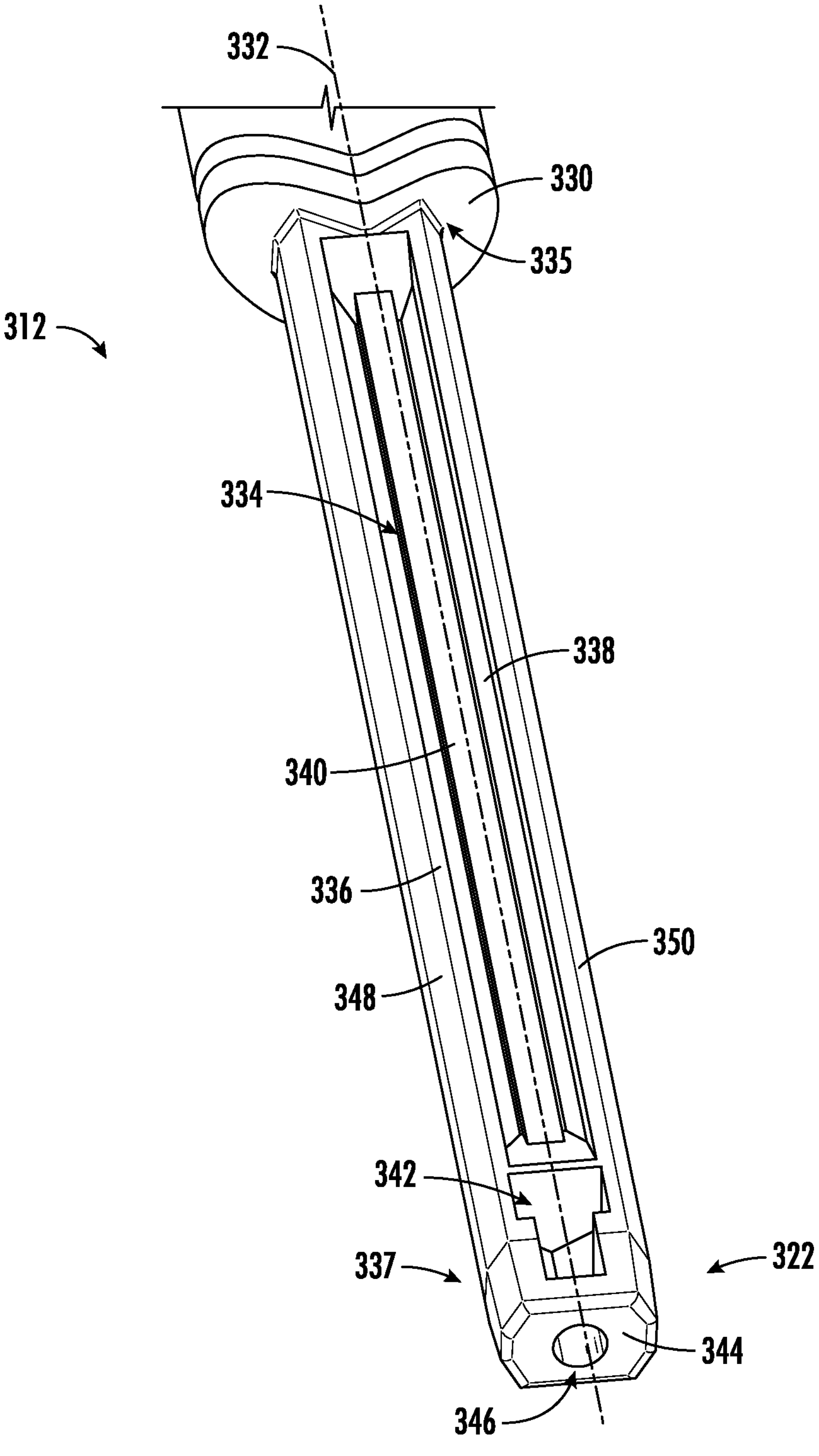
FIG. 16 is a detailed perspective view of a top portion of the shaft of the hammer of FIG. 14, according to an exemplary embodiment.
Figure 17:
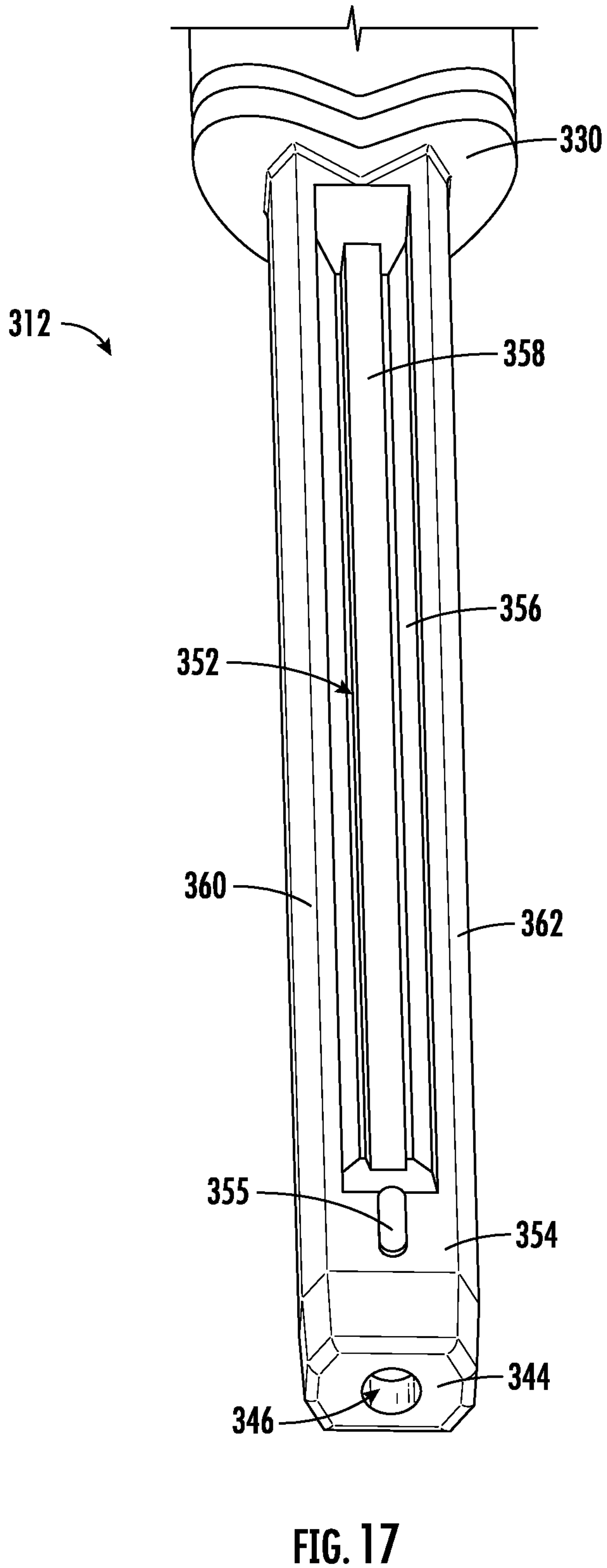
FIG. 17 is a detailed perspective view of a bottom portion of the shaft of the hammer of FIG. 14, according to an exemplary embodiment.

Referring to FIGS. 16-17, detailed perspective views of the top (in the orientation shown in FIG. 16) of shaft 312 and the bottom of shaft 312 are shown according to an exemplary embodiment. Bottom surface 354 of shaft 312 includes a projection 355 extending outward from bottom surface 354 toward grip insert 328. Grip insert 328 includes a corresponding channel 404 (see e.g., FIG. 22) configured to receive and/or engage with projection 355. When a user is assembling replaceable handle 324, projection 355 and channel 404 act together to prevent incorrect assembly of replaceable handle 324 by the user. Specifically, projection 355 and corresponding channel 404 prevent replaceable handle 324 from being positioned in the incorrect orientation, (i.e., upside down) because without the space provided by channel 404, shaft 312 and specifically projection 355 will not fit within grip insert 328.

Figure 18:
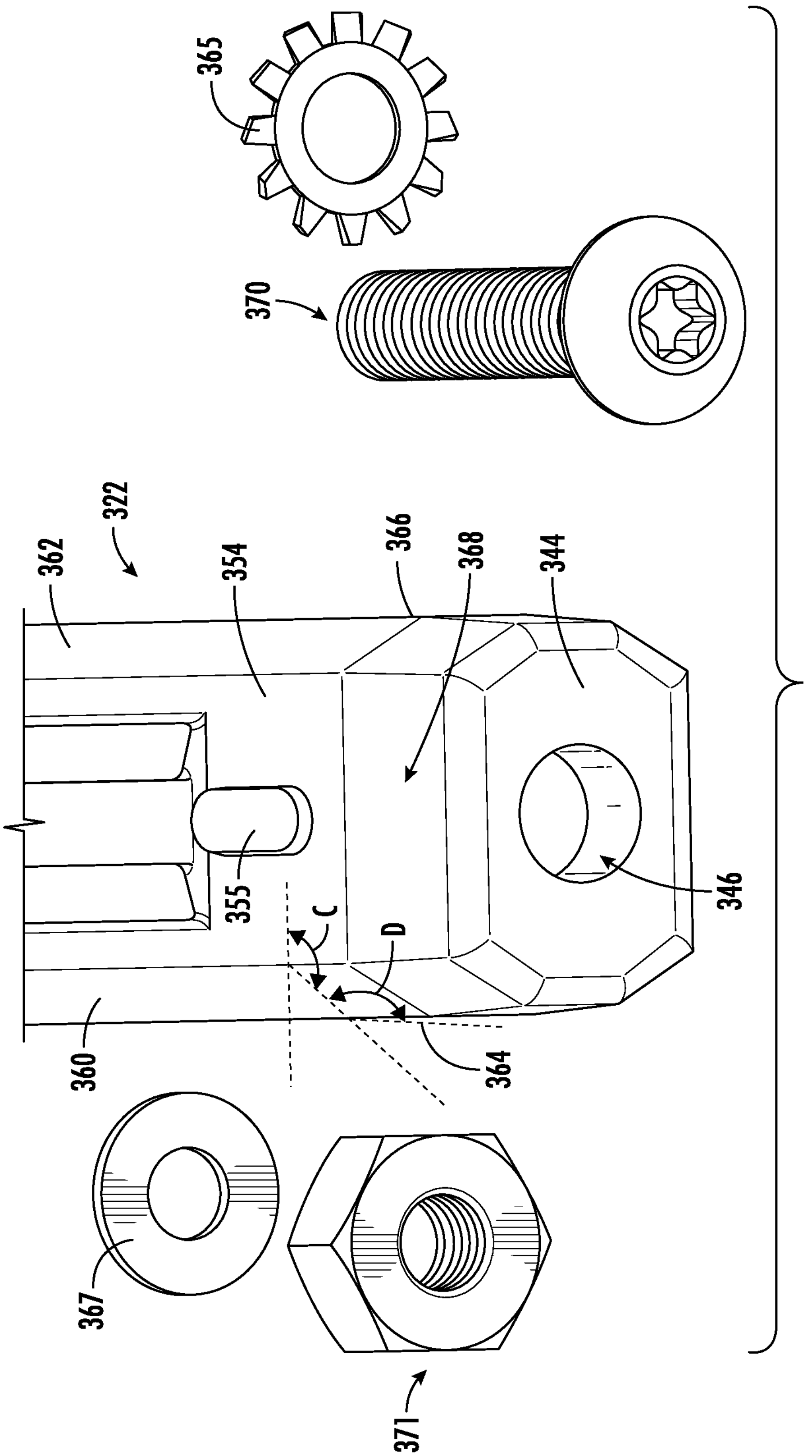
FIG. 18 is a partially exploded view of the end portion of the shaft of the hammer of FIG. 14, according to an exemplary embodiment.

Referring to FIG. 18, a detailed perspective view of gripping end 322 is shown according to an exemplary embodiment. A fastener, shown as a bolt 370 can be used to securely couple hammer 310 and specifically shaft 312 to replaceable handle 324. When bolt 370 is positioned within grip insert 328 and shaft 312 and tightened, a force is exerted on grip insert 28 such that grip insert 328 will be pressed against shaft 312 (e.g., end surface 344, top surface 336, bottom surface 354, etc.) providing additional force to maintain the position of replaceable grip 324 on shaft 312. In a specific embodiment, fastener 370 is a bolt that is used with a nut 371 and a washer 367 positioned within fastening recess 342 when replaceable handle 324 is assembled. In a specific embodiment, a head of fastener 370 extends through a bore 410 (see e.g., FIG. 26) of the grip 326 such that a user can tighten fastener 370 and/or replaceable handle 324 to the shaft 312 while the replaceable handle 324 is coupled to shaft 312 and/or hammer 310.

In a specific embodiment, first lower angled surface 360 is positioned at an angle C relative to bottom surface 354. In a specific embodiment, angle C is the same as angle A (i.e., about 120° (e.g., 120°±3°). In a specific embodiment, first side connecting surface 364 is positioned at an angle D relative to first lower angled surface 360. In a specific embodiment, angle D is the same as angle B (i.e., about 150° (e.g., 150°±3°). Similarly, first side connecting surface 364 is positioned at angle D relative to second upper angled surface 350 and second upper angled surface 350 is positioned at angle C relative to top surface 336.

Figure 19:
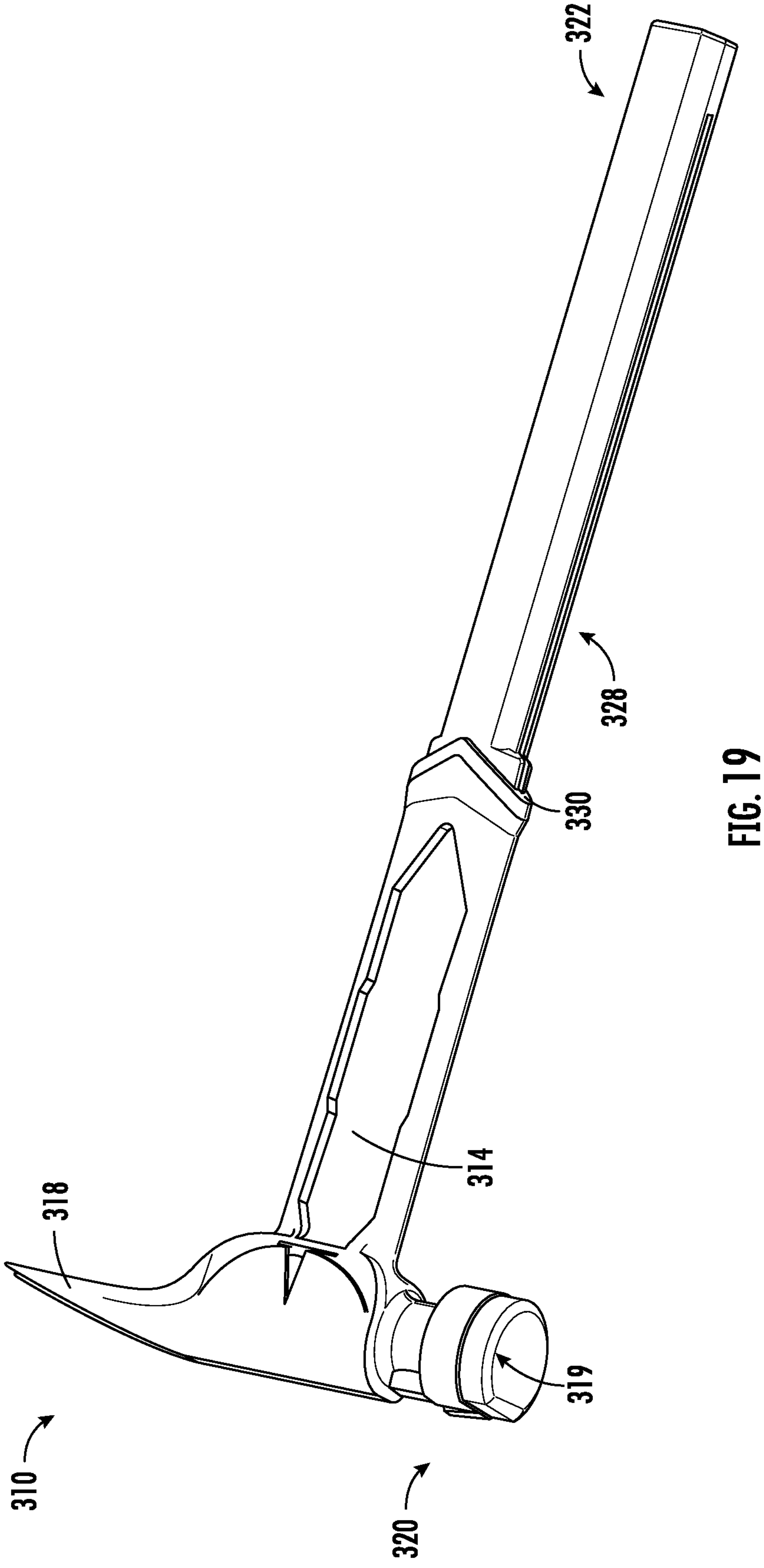
FIG. 19 is a side perspective view of the hammer of FIG. 14 with a grip insert, according to an exemplary embodiment.
Figure 20:
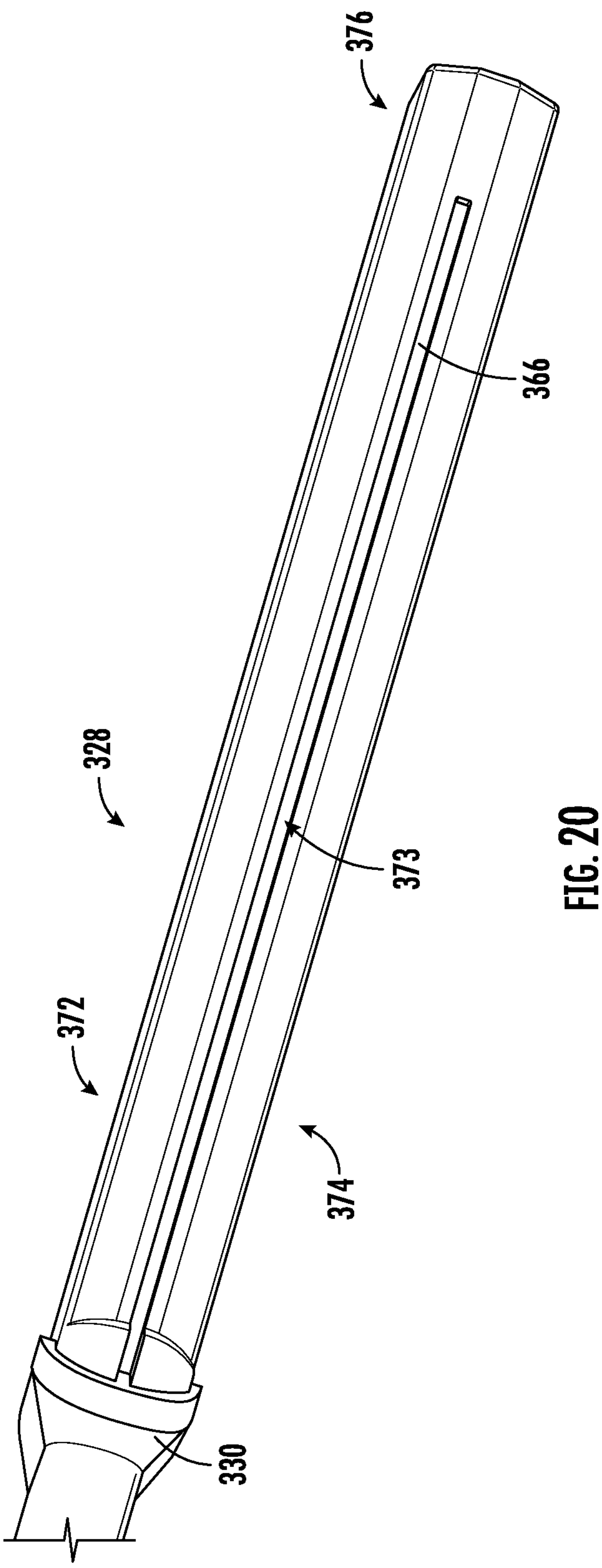
FIG. 20 is a detailed side perspective view of the hammer of FIG. 14 with the grip insert, according to an exemplary embodiment.
Figure 21:
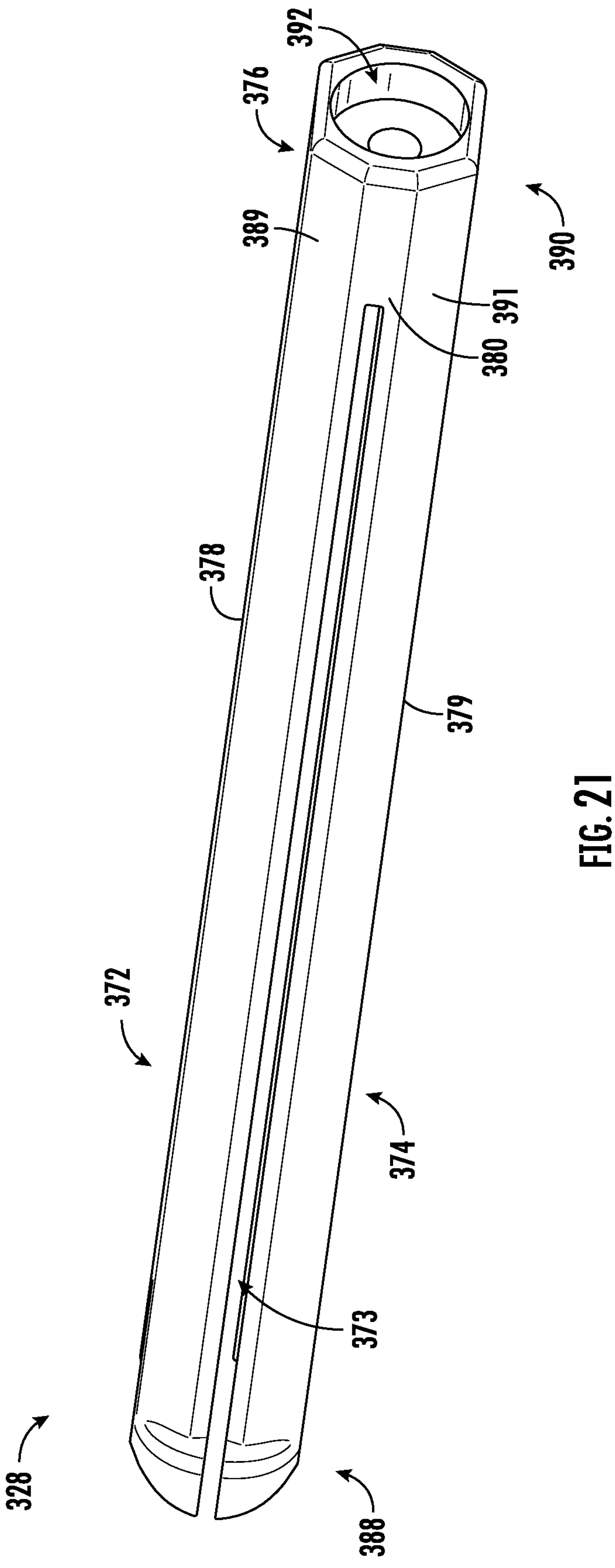
FIG. 21 is a side perspective view of the grip insert of FIG. 20, according to an exemplary embodiment.

Referring to FIGS. 19-21 details of grip insert 328 are shown, according to an exemplary embodiment. Unlike grip insert 28, upper section 372 and lower section 374 of grip insert 328 include portions that extend over the sides of shaft 312 (see e.g., 389, 391). Upper section 372 includes a pair of upper angled walls 389 connected to and extending downward at an angle (in the orientation shown in FIG. 21) from outward facing surface 378. Lower section 374 similarly a pair of lower angled walls 391 connected to and extending upward at an angle (in the orientation shown in FIG. 21) from outward facing surface 379. As shown in FIGS. 19-20, when grip insert 328 is coupled to shaft 312, inner surfaces of upper angled walls 389 faces first upper angled surface 348 and second upper angled surface 350 while inner surfaces of lower angled walls 391 faces first lower angled surface 360 and second lower angled surface 362. A pair of openings, shown as slits 373 extend along the longitudinal axis of grip insert 328 and are defined between each upper angled wall 389 and the corresponding lower angled wall 391.

Figure 22:
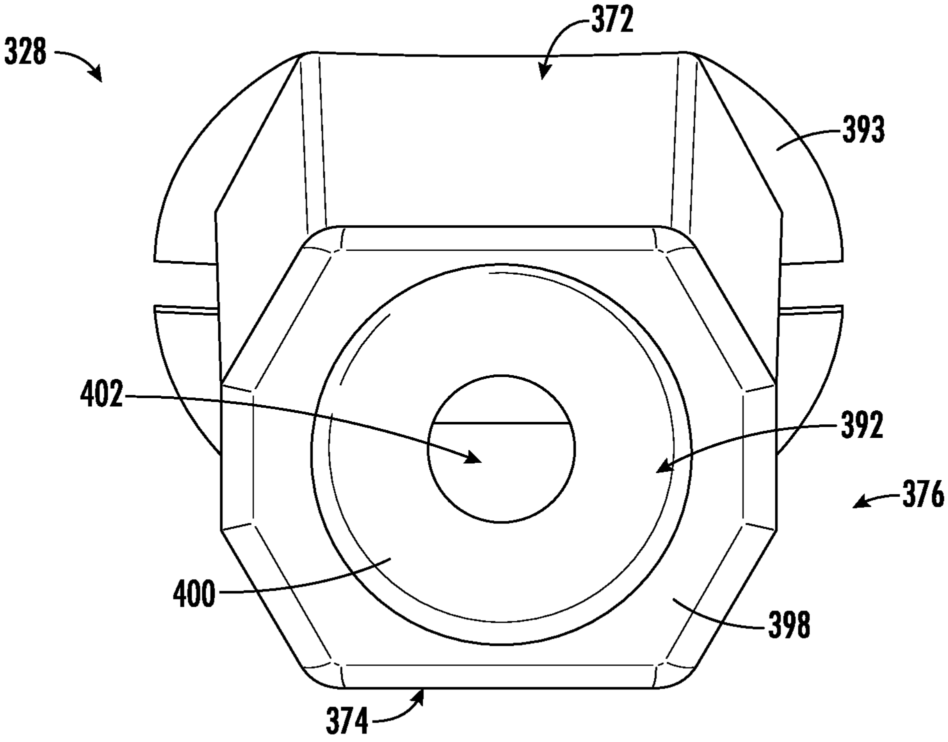
FIG. 22 is a rear perspective view of the grip insert of FIG. 21, according to an exemplary embodiment.
Figure 23:
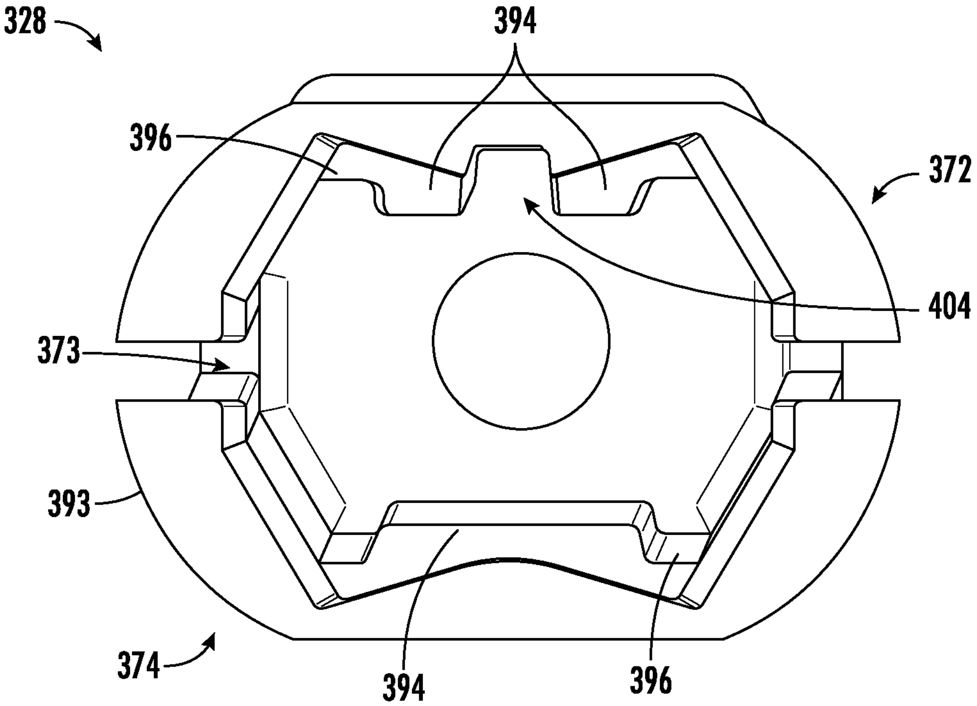
FIG. 23 is a front perspective view of the grip insert of FIG. 21, according to an exemplary embodiment.
Figure 24:
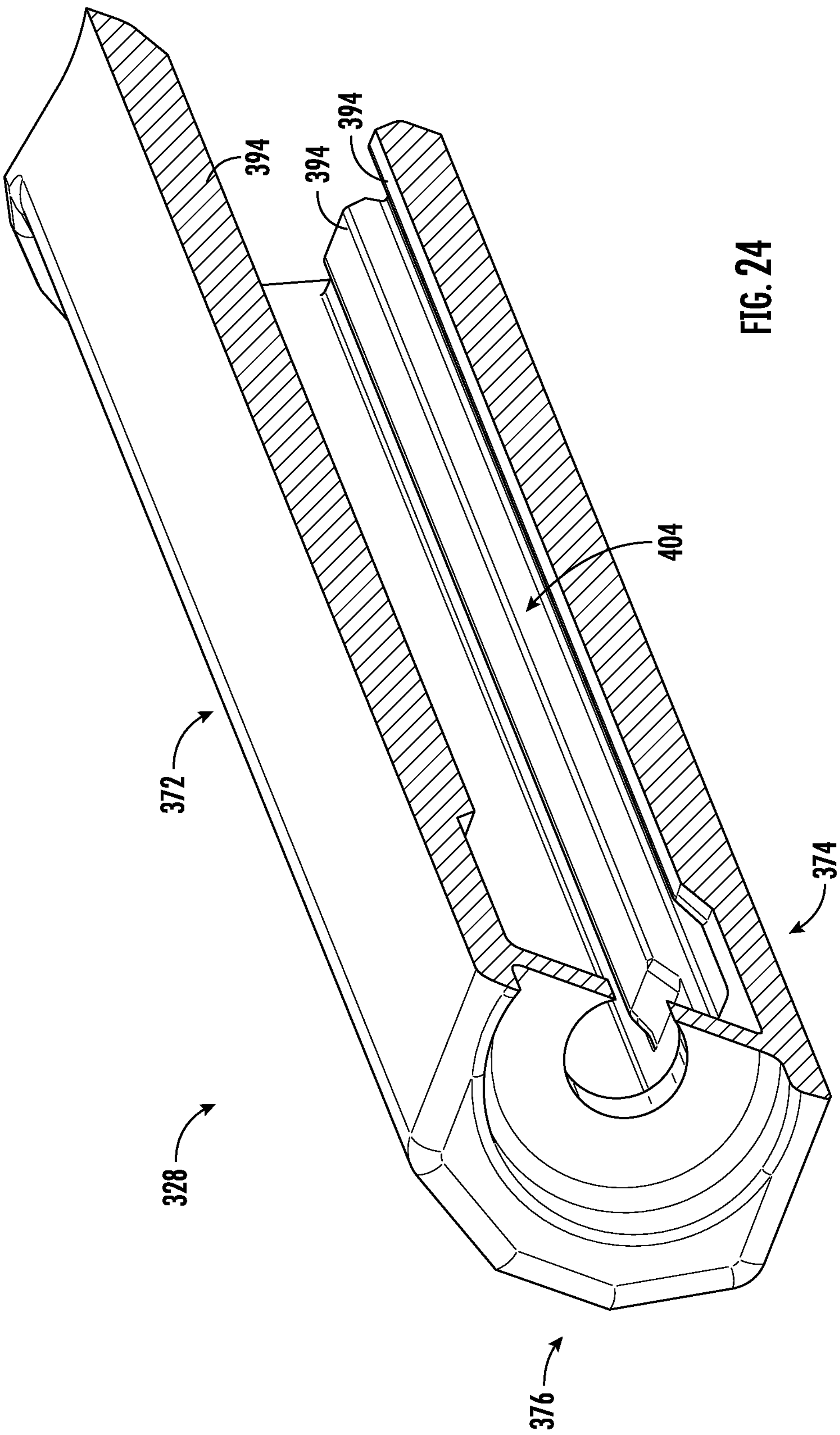
FIG. 24 is a cross-sectional view of the grip insert of FIG. 21, according to an exemplary embodiment.

Referring to FIGS. 22-24, perspective views of grip insert 328 are shown according to an exemplary embodiment. When replaceable handle 324 is assembled, a first end 388 of grip insert 328 is positioned adjacent to neck 314 and a second end 390 that opposes first end 388 is positioned adjacent to gripping end 322 of hammer 310. First end 388 of grip insert 328 is positioned between head 316 and the second end 390. A lip 393 is positioned at first end 388 of grip insert 328. As shown in FIGS. 14-15, in a specific embodiment, grip 326 surrounds at least a majority of the second end 390 of grip insert 328. In various specific embodiments, grip 326 may entirely surround the second end 390 of grip insert 328.

Upper section 372 and lower section 374 each include an opposing inward facing surface 396. A single projection 394 is coupled to at least one of the inward facing surfaces 396 while one or more projections 394 are coupled to the opposing inward facing surface 396. The corresponding projections 394 act as anti-rotational stiffening ribs for grip insert 328 and are configured to engage with first channel 334 and second channel 352 respectively when the replaceable handle 324 is assembled. The channel 404 configured to receive projection 355 of shaft 312 is positioned between one or more projections 394 to prevent misalignment and/or incorrect orientation of replaceable handle 324 during assembly or regripping.

As previously discussed, the engagement between upper angled walls 389 and lower angled walls 391 and first upper angled surface 348, second upper angled surface 350, first lower angled surface 360 and second lower angled surface 362 respectively provides resistance to twisting or rotation of replaceable handle 324 relative to shaft 312. Additionally, Applicant believes engagement between corresponding projections 394 and first and second channels 334, 352 of shaft 312 reduces and/or further prevents undesired rotation of the grip insert 328 and replaceable handle 324 relative to hammer 310.

Figure 25:
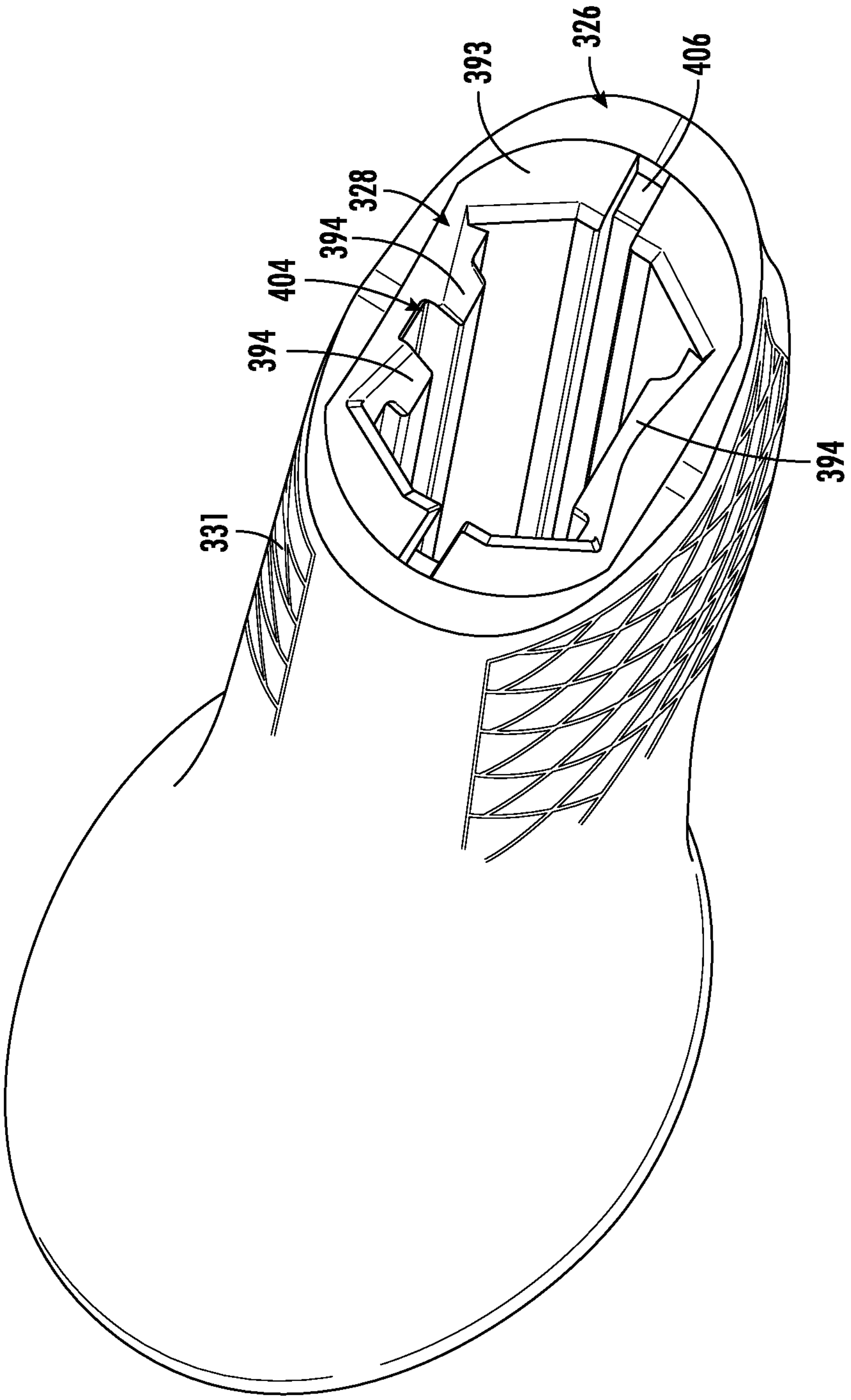
FIG. 25 is a perspective view of the grip and grip insert of the hammer of FIG. 14, according to an exemplary embodiment.
Figure 26:
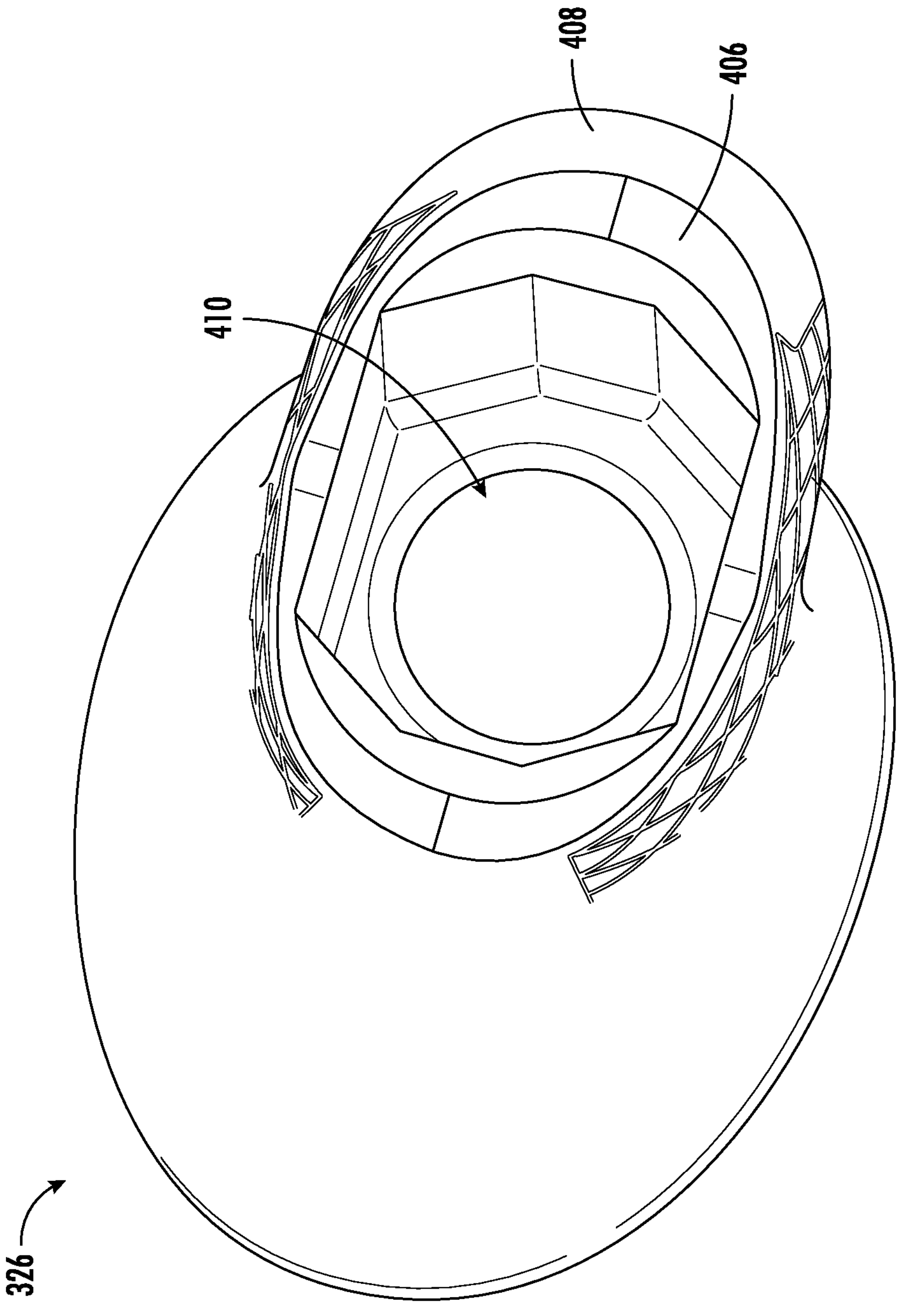
FIG. 26 is a perspective view of the grip of the hammer of FIG. 14, according to an exemplary embodiment.

Referring to FIG. 25, a perspective view of grip 326 coupled to grip insert 328 is shown, according to an exemplary embodiment. Grip 326 includes an internal ledge 406 that engages lip 393 of grip insert 328. As shown in FIG. 26, internal ledge 406 is recessed or set back from end surface 408 that is positioned adjacent to first end 388 of grip insert 328. Grip 326 further includes the through bore 410. When replaceable handle 324 is coupled to hammer 310, through bore 410 is aligned with bore 402 and with bore 346 such that fastener 370 can extend through the grip 326, grip insert 328 and shaft 312 to securely couple replaceable handle 324 to hammer 310. In other words, fastener 370 extends through second end 390 of grip insert 328 along longitudinal axis 322 of hammer 310 to securely couple replaceable handle 324 to the shaft 312.

Figure 27:
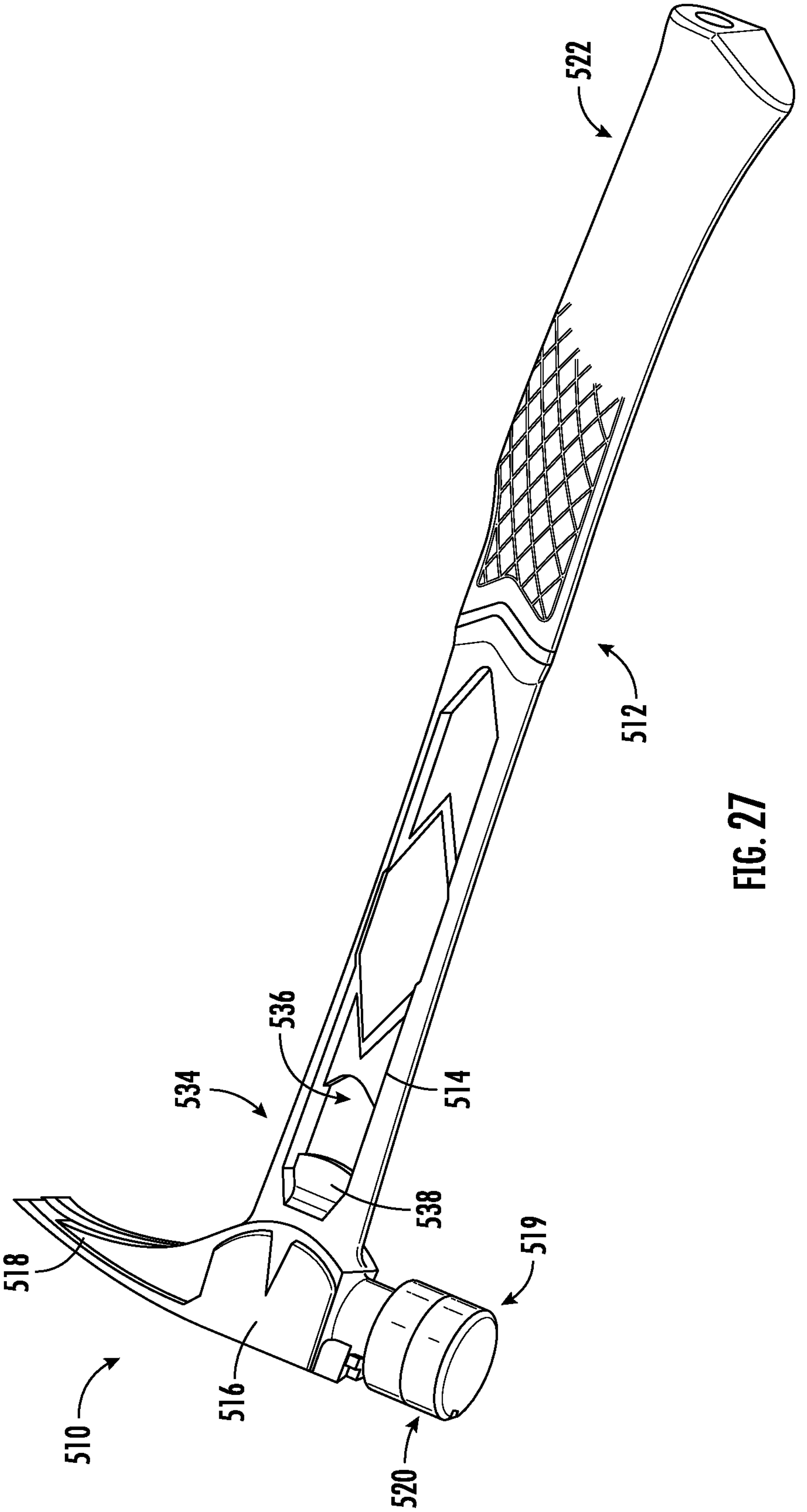
FIG. 27 is a top perspective view of a hammer, according to another exemplary embodiment.
Figure 28:
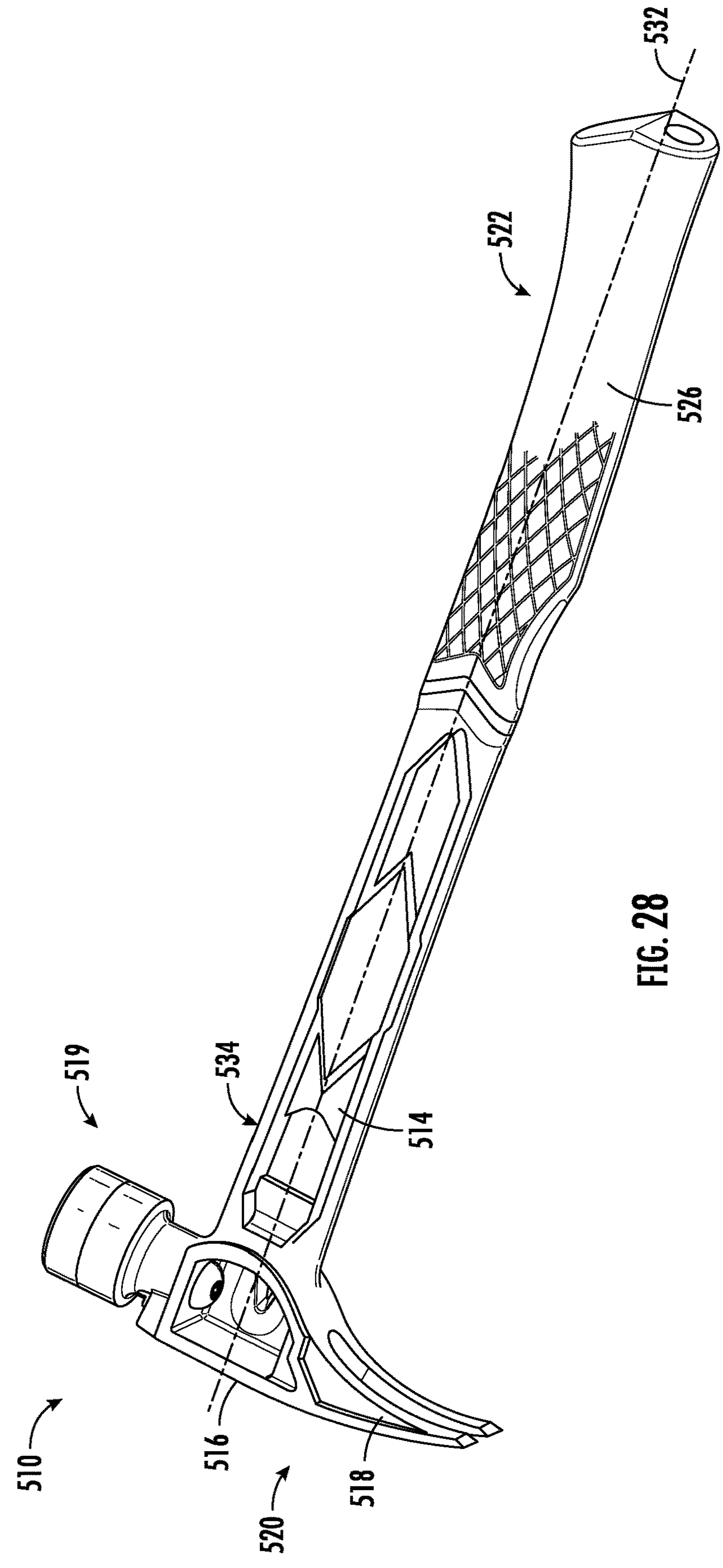
FIG. 28 is a bottom perspective view of the hammer of FIG. 27, according to an exemplary embodiment.

Referring to FIGS. 27-28, various aspects of a hand tool, shown as a hammer 510, are shown. Hammer 510 can be utilized with replaceable handle 24, replaceable handle 124 and/or replaceable handle 324. In general, hammer 510 is substantially the same as hammer 10 and/or hammer 310 except for the differences discussed herein.

Neck 514 of hammer 510 includes a pulling feature shown as stake puller 534. The stake puller 534 includes an opening 536. When a user wants to pull a stake out of the ground or a workpiece (i.e., wood) hammer 510 is moved so opening 536 is around the stake. A lever portion 538 of the stake puller engages the stake to provide a removing force. Additionally, stake puller 534 can be used with a pry bar to remove a fastener such as a nail. When an engagement end of the pry bar is grasping a nail, the opposing handle end of the pry bar can be extended through opening 536 and the user can engage and/or pull on the pry bar allowing a user to more easily remove the nail.

Figure 29:
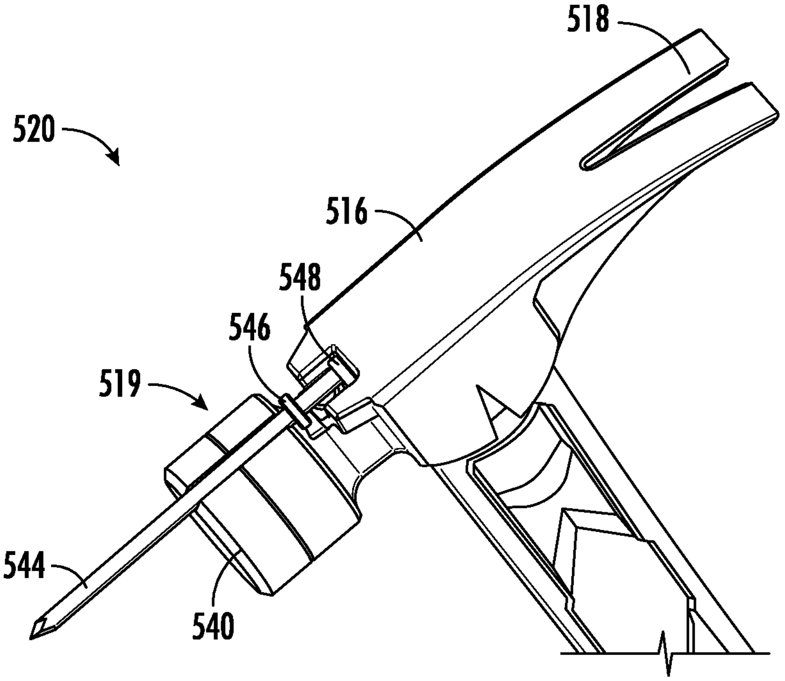
FIG. 29 is a detailed perspective view of a nail retention system of the hammer of FIG. 27 holding a nail, according to an exemplary embodiment.
Figure 30:
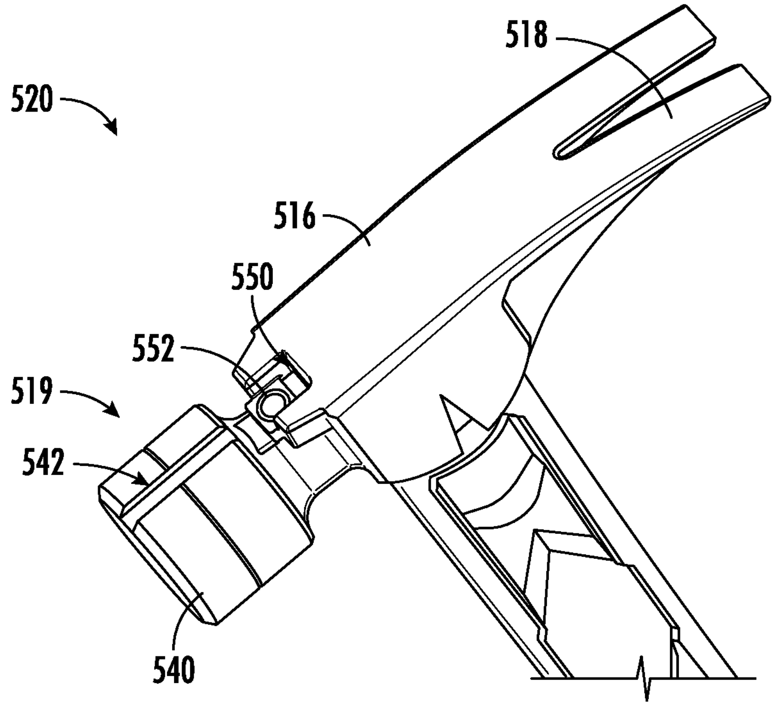
FIG. 30 is a detailed perspective view of a nail retention system of the hammer of FIG. 27 without a nail, according to an exemplary embodiment.

Referring to FIGS. 29-30, details of a nail retention system of hammer 510 are shown according to an exemplary embodiment. In a specific embodiment, head 516 includes a replaceable striking face 540. A fastener channel, shown as nail channel 542 extends through head 516 and a portion of replaceable striking face 540. A fastener, shown as a nail 544 can be positioned within nail channel 542 to retain a nail on head 516 of hammer 510. In a specific embodiment, nail 544 is a duplex nail. In such an embodiment, nail 544 includes a first head 546 and a second head 548 to allow for easy removal of the duplex nail.

As shown in FIG. 30, head 516 includes a recessed section 550. Positioned within recessed section 550 is a magnetic component shown as magnet 552. Magnet 552 acts to further secure and retain nail 544 on head 516. In contrast to conventional fastener retention systems that frequently engage with a shaft of the nail (i.e., positioned along the nail channel 542), Applicant believes the nail has improved retention when the magnet 552 engages with a head of the nail 544. In a specific embodiment, magnet 552 is positioned to engage nail 544 between first head 546 and second head 548.

Figure 31:
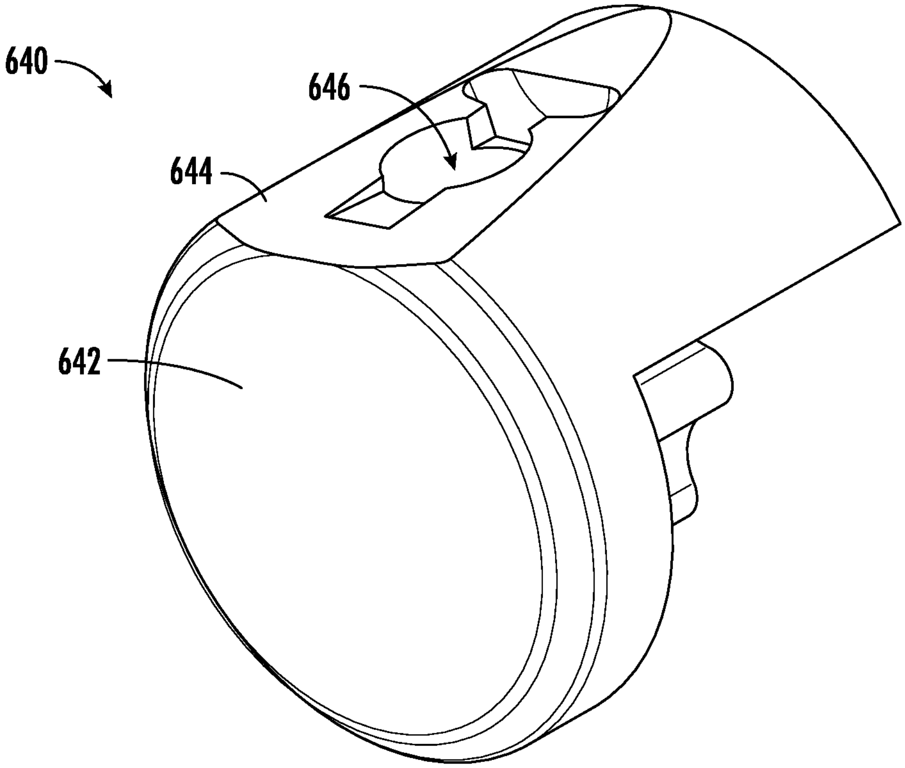
FIG. 31 is a perspective view of a hammer head with a nail retention system on a replaceable hammer face, according an exemplary embodiment.

Referring to FIG. 31, details of a nail retention system is shown according to another exemplary embodiment. A replaceable striking face 640 includes a striking surface 642 and an upper surface 644 that extends in a generally perpendicular orientation away from striking surface 642. Upper surface 644 includes a recess 646 configured to receive a magnetic component (e.g., 552) to retain a fastener such as a nail on replaceable striking face 640.

Figure 32:
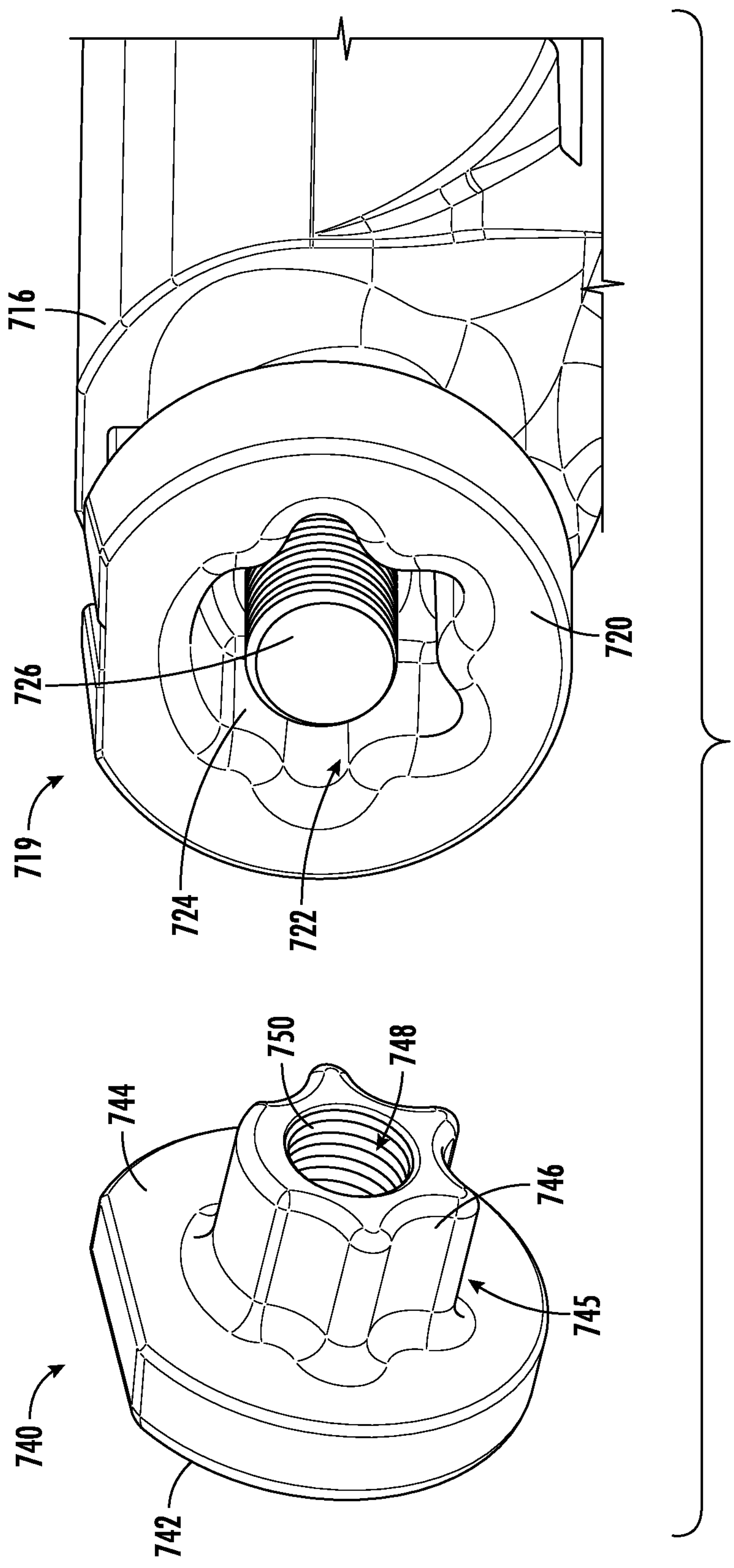
FIG. 32 is a partially exploded view of a hammer head with a replaceable hammer face, according to an exemplary embodiment.

Referring to FIG. 32, a partially exploded view of a hammer head 716 is shown according to an exemplary embodiment. In general, head 716 is substantially the same as head 16, head 316 and/or head 516 except for the differences discussed herein. Head 716 can be utilized with a replaceable striking face 740. Striking face 740 includes a striking surface 742 and a rear, inward facing (i.e., toward head 716) surface 744 that opposes striking surface 742. When head 716 is fully assembled, rear, inward facing surface 744 is positioned along an outward facing surface 720 of head 716.

A connector, shown as projection 745 extends away from rear, inward facing surface 744 toward head 716 when striking face 740 is coupled to head 716. Specifically, projection 745 is received by a bore 722 on head 716 that is defined in outward facing surface 720. Bore 722 has a shape corresponding to a shape of projection 745. In various specific embodiments, projection 745 and bore 722 have a star shape (i.e., 5 extensions or arms). In other embodiments, bore 722 and projection 745 may have other corresponding shapes (i.e., polygonal, triangular, etc.).

Projection 745 includes a radially outward facing surface 746. When striking face 740 is coupled to head 716, radially outward facing surface 746 is positioned against and/or engages a radially inward facing surface 724 of bore 722. To further secure replaceable striking face 740 to head 716 a fastener shown as screw 726 can be used. Projection 745 further includes a bore 748 with a threaded inner surface 750 configured to engage screw 726.

Figure 33:
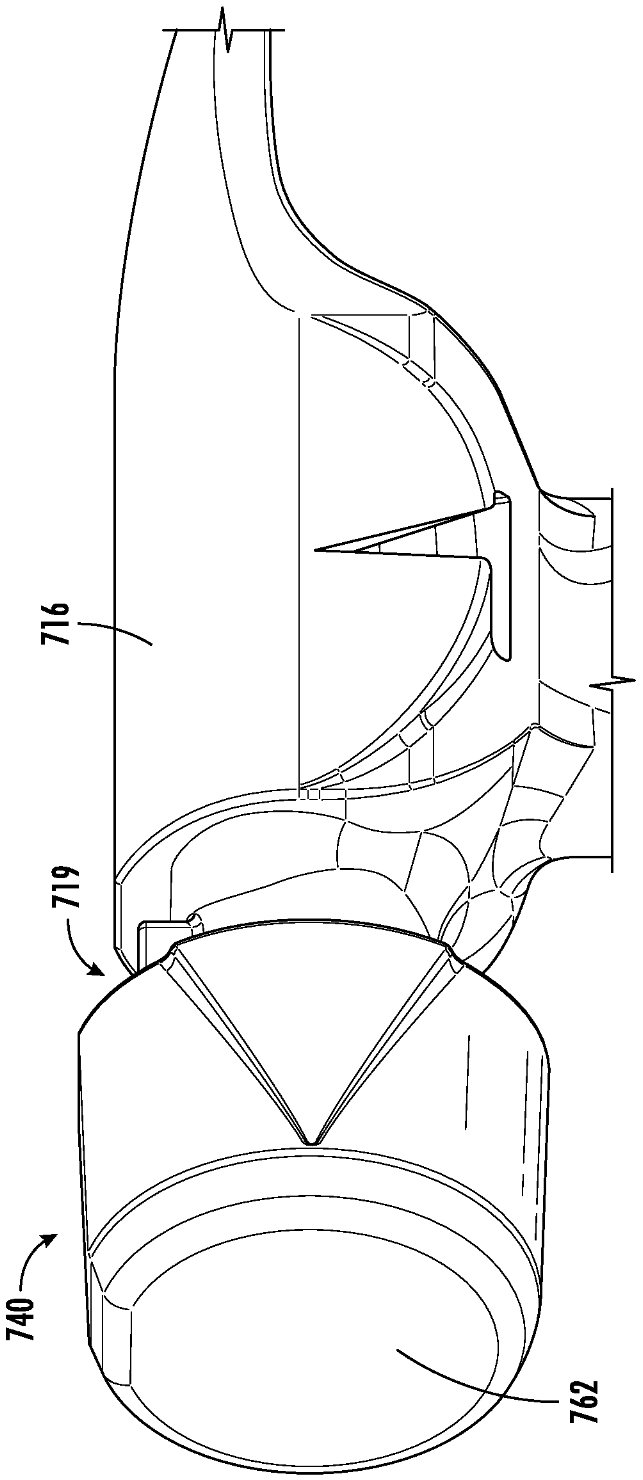
FIG. 33 is a perspective view of a hammer head with a mallet face, according an exemplary embodiment.
Figure 34:
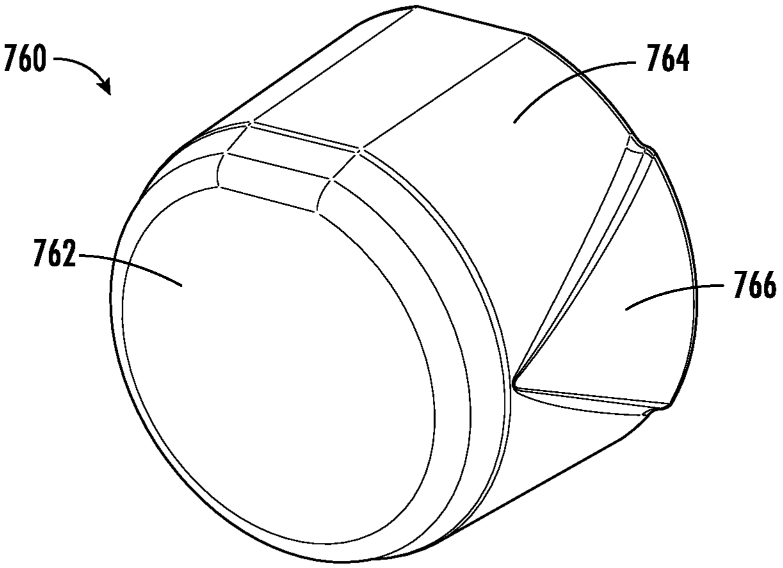
FIG. 34 is a front perspective view of the mallet face of FIG. 33, according to an exemplary embodiment.
Figure 35:
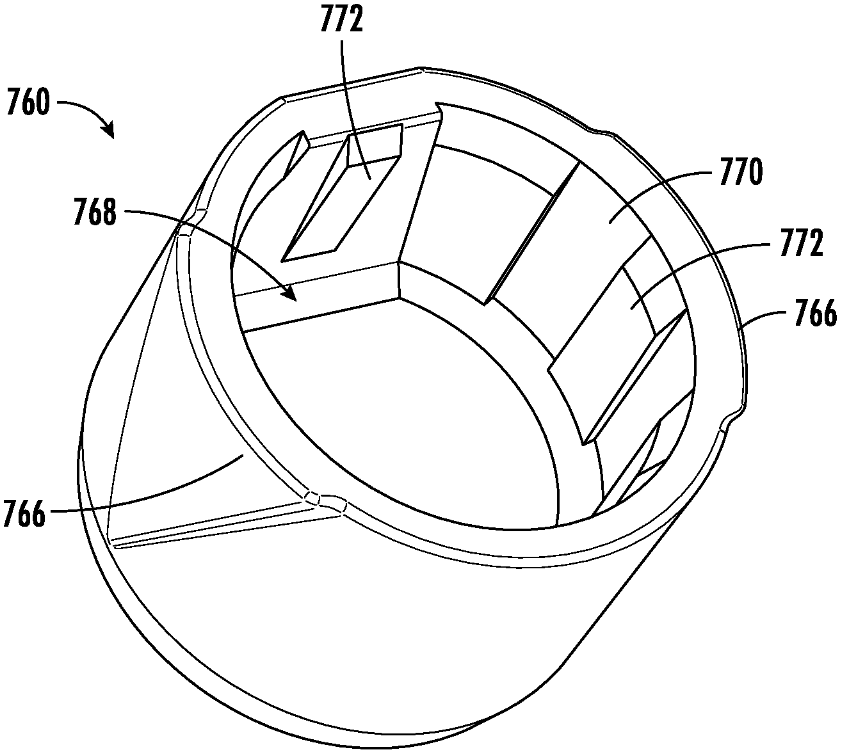
FIG. 35 is rear perspective view of the mallet face of FIG. 33, according to an exemplary embodiment.

Referring to FIGS. 33-35, details of a mallet face 760 that can be utilized with head 716, head 516, head 316 and/or head 16 is shown according to an exemplary embodiment. As will generally be understood, mallets are commonly used as striking tool, but are frequently made of material that is softer than a hammer face (i.e., wood, rubber, plastic etc.) to avoid crushing or denting a surface. Mallet face 760 allows a user to have a single striking tool that can function as either a hammer or mallet without requiring carrying multiple striking tools. In a specific embodiment, mallet face 760 is formed from a polymer. In another specific embodiment, mallet face is formed from thermoplastic polyurethane (TPU).

Mallet face 760 includes a mallet striking surface 762 on an exterior or outer surface 764. In a specific embodiment, outer surface 764 includes a project or wedge 766 that aids a user in placing or pulling the mallet face 760 during installation and/or removal on the hammer. In various specific embodiments, wedge 766 is symmetric. Mallet face 760 has a recessed portion 768 that receives the striking face of the hammer when mallet face 760 is coupled to a hammer head (see e.g., FIG. 33). Recessed portion 768 includes an interior or inner surface 770. A plurality of internal ribs 772 are coupled to inner surface 770. Applicant believes internal ribs 772 aid in the removal of the mallet face 760 by preventing a vacuum effect when a user tries to remove or pull the mallet face 760 off of head 716.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A hammer comprising:
a head including a striking portion;
a shaft rigidly coupled to the head and extending along a longitudinal axis of the hammer; and
a replaceable handle removably couplable to the shaft, the replaceable handle comprising:
a grip insert coupled to the shaft;
a grip coupled to and at least partially surrounding the grip insert; and
a fastener securing the replaceable handle to the shaft, the fastener extending along the longitudinal axis of the hammer, wherein the grip extends past a distal end of the fastener;
wherein a radially outward facing outer surface of the shaft engages the grip insert to resist rotation of the replaceable handle relative to the shaft during use of the hammer; and
wherein a shape of a cross-section of the shaft taken perpendicular to a longitudinal axis of the shaft is octagonal such that the shaft resists rotation of the grip and the grip insert relative to the shaft during use.

2. The hammer of claim 1, wherein the radially outward facing outer surface of the shaft extends a length of the shaft.

3. The hammer of claim 1, the shaft further comprising a channel extending along the longitudinal axis of the hammer.

4. The hammer of claim 3, wherein the grip insert includes a longitudinal projection and wherein the longitudinal projection extends into and engages with the channel of the shaft such that the grip insert resists rotation of the replaceable handle relative to the shaft during use of the hammer.

5. The hammer of claim 1, further comprising:
a pair of opposing channels defined in the shaft, the pair of opposing channels extending along the longitudinal axis of the hammer; and
a pair of projections on the grip insert, the pair of projections extending inward toward the shaft and along the longitudinal axis of the hammer;
wherein, when the replaceable handle is coupled to the shaft, each of the projections is positioned within and engages one channel of the pair of opposing channels.

6. The hammer of claim 1, wherein the grip insert is formed from a first polymer material and the grip is formed from a second polymer material, and wherein the first polymer material is different from the second polymer material.

7. The hammer of claim 1, wherein a proximal end of the fastener is coupled to the grip insert, and wherein the distal end opposes the proximal end.

8. A hammer comprising:
a head;
a shaft rigidly coupled to the head and extending along a longitudinal axis of the hammer;
a replaceable handle coupled to the shaft, the replaceable handle comprising:
a grip insert coupled to the shaft, the grip insert comprising:
a first end; and
a second end;
wherein the first end is positioned between the head and the second end; and
a grip coupled to the grip insert and surrounding the second end of the grip insert; and
a fastener extending through the shaft and the second end of the grip insert to couple the replaceable handle to the shaft, the fastener comprising a longitudinal axis extending along the longitudinal axis of the hammer;
wherein the grip provides a compressive force on the grip insert such that the replaceable handle securely engages with the shaft; and
wherein a shape of a cross-section of the shaft taken perpendicular to a longitudinal axis of the shaft is polygonal such that the shaft resists rotation of the of the grip and the grip insert relative to the shaft during use.

9. The hammer of claim 8, wherein the grip insert is formed from a first material and the grip is formed from a second material different than the first material.

10. The hammer of claim 9, wherein the first material is a thermoplastic polymer and the second material is a thermoplastic elastomer.

11. The hammer of claim 9, wherein the first material is polypropylene and the second material is a thermoplastic vulcanizate.

12. The hammer of claim 8, wherein the shape of the cross-section of the shaft taken perpendicular to the longitudinal axis of the shaft is octagonal.

13. A hammer comprising:
a head;
a shaft coupled to the head and extending along a longitudinal axis of the hammer; and
a replaceable handle coupled to the shaft, the replaceable handle comprising:
a grip insert coupled to the shaft, the grip insert comprising:
a first end; and
a second end;
wherein the first end is positioned between the head and the second end; and
a grip coupled to the grip insert; and
a fastener, the fastener extending through the second end of the grip insert along the longitudinal axis of the hammer to securely couple the replaceable handle to the shaft, wherein the grip extends beyond an outermost portion of the fastener;
wherein the shaft is a polygonal prism and an outer surface of the shaft engages the grip insert to resist rotation of the replaceable handle relative to the shaft.

14. The hammer of claim 13, wherein a head of the fastener extends through a bore in the grip such that a user can tighten the fastener and the replaceable handle to the shaft while the replaceable handle is coupled to the shaft.

15. The hammer of claim 13, wherein the grip surrounds at least a majority of the second end of the grip insert.

16. The hammer of claim 13, further comprising:
a channel defined in the shaft, the channel extending along the longitudinal axis of the hammer; and
a longitudinal projection coupled to the grip insert, the longitudinal projection configured to engage with the channel of the shaft such that the grip insert resists rotation of the replaceable handle relative to the shaft during use of the hammer.

* * * * *